United States Patent [19]

Ohtsuki

[11] Patent Number: 4,496,997
[45] Date of Patent: Jan. 29, 1985

[54] CUE DATA RECORDING APPARATUS

[75] Inventor: Tadashi Ohtsuki, Yokohama, Japan

[73] Assignee: Sony Corporation, Tokyo, Japan

[21] Appl. No.: 416,684

[22] Filed: Sep. 10, 1982

[30] Foreign Application Priority Data

Sep. 14, 1981 [JP] Japan .................................. 56-145286

[51] Int. Cl.$^3$ .......................... G11B 27/02; G11B 5/86
[52] U.S. Cl. ........................................ 360/13; 360/15; 360/32
[58] Field of Search ........................ 360/13, 15, 32, 48, 360/72.2

[56] References Cited

U.S. PATENT DOCUMENTS

| | | | |
|---|---|---|---|
| 4,211,997 | 7/1980 | Rudnick et al. | 360/13 |
| 4,249,218 | 2/1981 | Davis et al. | 360/13 |
| 4,363,049 | 12/1982 | Ohtsuki et al. | 360/13 |
| 4,395,738 | 7/1983 | Hedlund et al. | 360/32 |

Primary Examiner—Vincent P. Canney
Attorney, Agent, or Firm—Lewis H. Eslinger; Alvin Sinderbrand

[57] ABSTRACT

Apparatus is provided for recording cue data identifying characteristics of information recorded in tracks on a magnetic tape; for example, the cue data identifying beginning, end and various predetermined portions of program material, such as an audio program, a video program, or the like. The recorded information is played back, and a cue signal generator generates respective cue signals upon the occurrences of respective ones of the predetermined characteristics in the played back information. For example, one type of cue signal is generated when the beginning of the program is played back, another type of cue signal is generated when the end of the program is played back, and various respective cue signals are generated when different predetermined portions of the program are played back. In addition to generating the cue signals, code signals having a predetermined relationship with the played back information also are generated. For example, the code signals may represent the relative locations on the magnetic tape at which the predetermined characteristics (e.g. beginning, end and predetermined portions) of the program are recorded. A memory stores the code and cue signals, and a format circuit produces cue data in a predetermined format as a function of the stored code and cue signals. The cue data in this predetermined format then is recorded on the magnetic tape in a track which differs from the tracks in which the information is recorded. Alternatively, the cue data is recorded on a disc record, such as a master disc from which replicas subsequently may be made.

25 Claims, 26 Drawing Figures

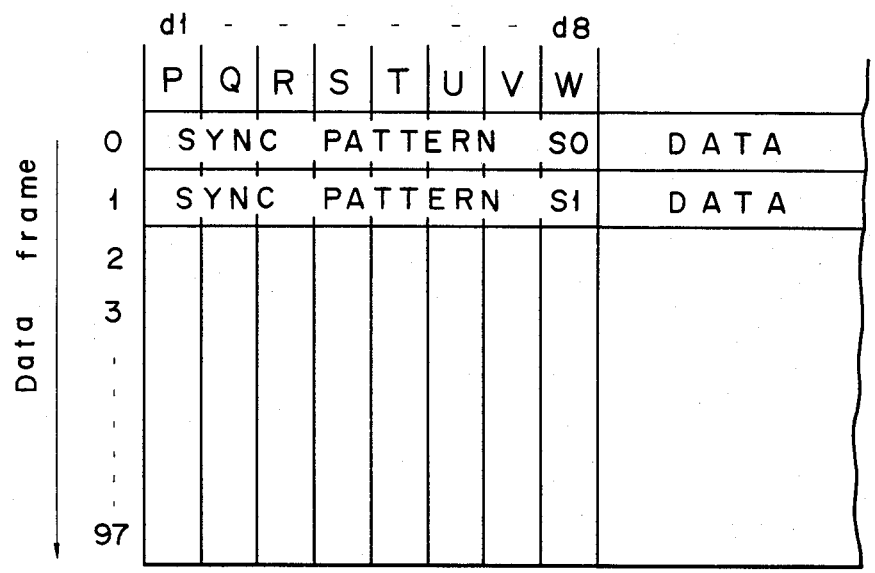
Fig. 1A
Fig. 1B
Fig. 2A
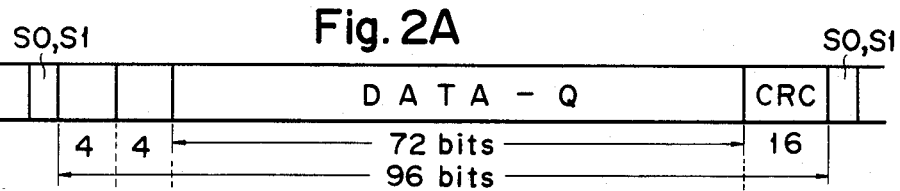
Fig. 2B
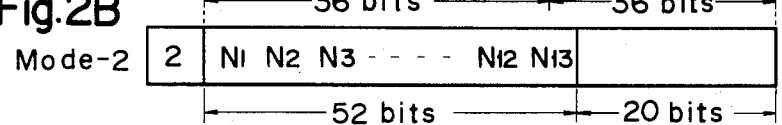
Fig. 2C

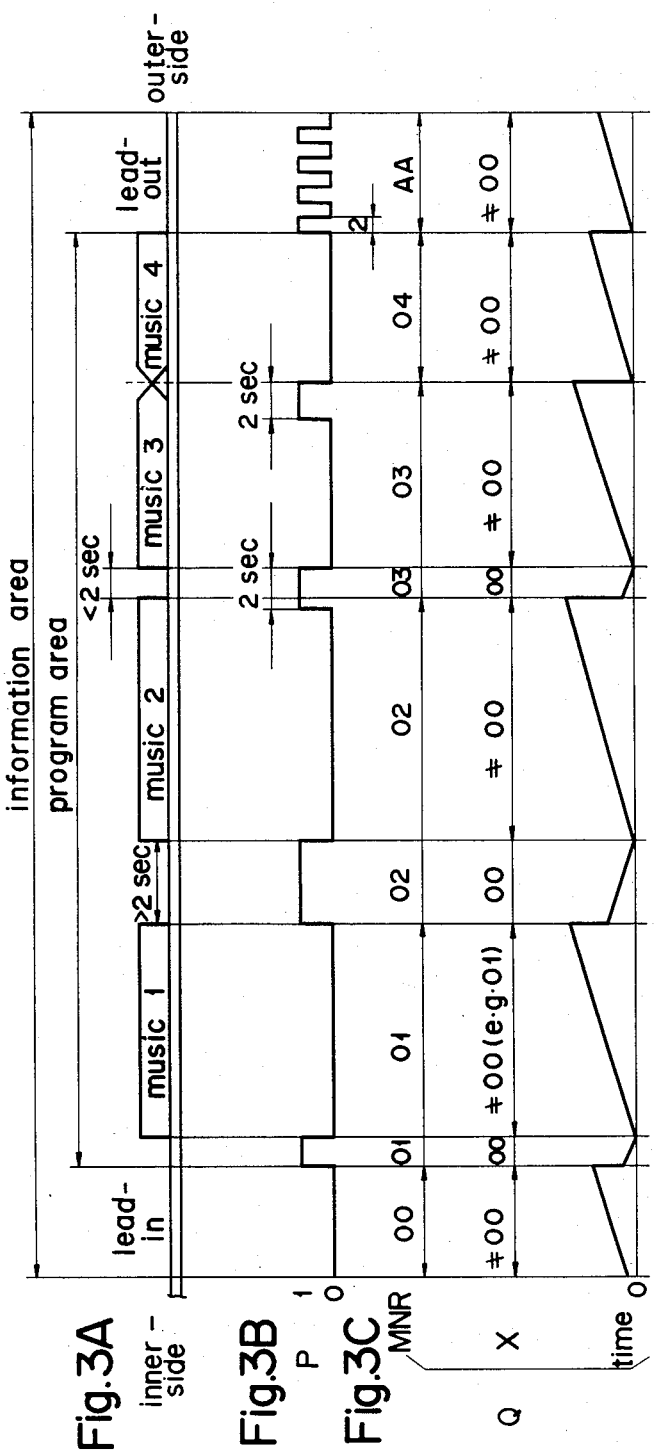

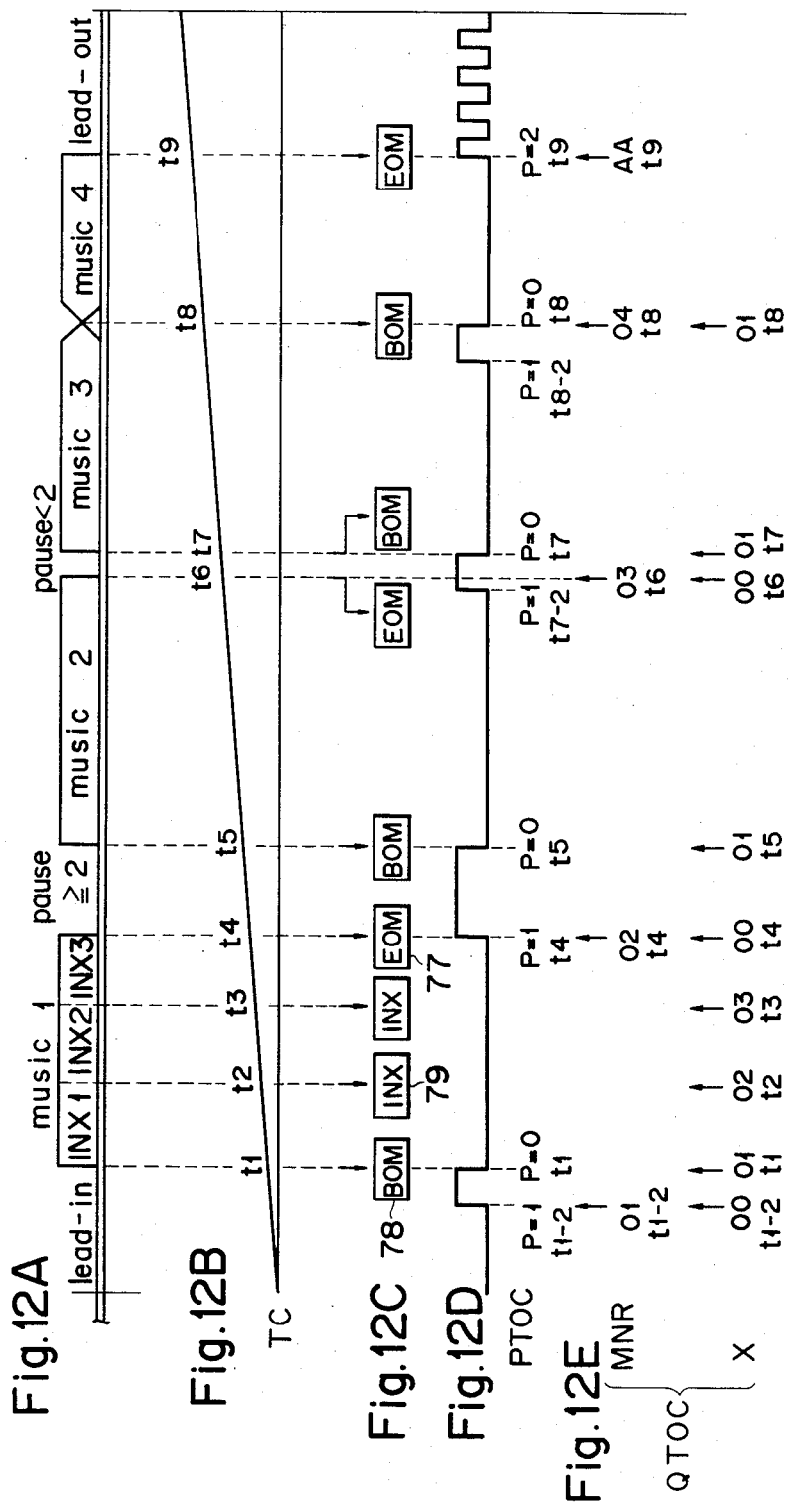

CUE DATA RECORDING APPARATUS

BACKGROUND OF THE INVENTION

This invention relates to cue data recording apparatus and, more particularly, to such apparatus which records cue data representative of predetermined characteristics of information recorded in tracks on a magnetic tape, which cue data is useful in identifying the type and location of recorded information. The present invention is further concerned with cue data recording apparatus for recording cue data that identifies and relates to audio program information on a magnetic tape. The invention additionally relates to cue data recording apparatus for recording cue data of the aforementioned type on a record disc so as to facilitate the selection of desired programs to be played back from that disc.

The present invention finds ready application in the recording of cue data representing predetermined characteristics of various types of information. For example, the cue data may relate to the content, quantity, quality, etc. of program information that is recorded on a record medium such as magnetic tape. Such program information may be a video program, an audio program, or the like. Moreover, the record medium may be a magnetic tape, a magnetic disc, a video disc, a digital audio disc (generally known as an audio PCM disc), and the like. It will be appreciated that, although the invention described below is readily adapted for widespread use with all of the foregoing types of record media and program information, a particular application of this invention will be described in conjunction with the digital audio, or audio PCM disc.

Conventionally, audio discs contain analog audio information recorded therein in the form of various undulations in a spiral groove. Such undulations are sensed by a stylus of a playback device, the stylus riding in the spiral groove and following the various undulations therein. Typically, the stylus is coupled to a magnetic sensor, or cartridge, whereby the mechanical motion of the stylus is converted to an electrical signal; and this electrical signal ultimately is converted into audible sound. Recently, it has been proposed to digitize audio information, and to record the digital audio signals directly on a disc. The digital signals are sensed, or played back, by optical means such as a scanning laser beam. The reproduced digital signals then are re-converted back to audio signals which are used to generate corresponding sounds. Many advantages arise from the digital recording of audio information, such as markedly improved fidelity of the original audio signals, the ability to produce high-density digital audio discs which contain a large quantity of information and thus permit relatively long playback times, and, since the playback "head" need not be in physical contact with the disc, the disc will be subjected to virtually no wear, and selected portions, or programs may be rapidly accessed for reproduction.

In digitizing the audio information to be recorded on the aforementioned digital audio disc, analog audio signals generally are sampled, and each sample is converted to a digital signal, such as a pulse code modulated (PCM) signal. This technique, which may be altered and modified in various respects, has given rise to the designation of the audio PCM disc.

To assure proper and desirable playback of the audio information, various synchronizing and control signals also are recorded on the disc, and such synchronizing and control signals advantageously are multiplexed with the digital audio signals. The use of digital techniques enables at least some of the control signals to function as cue signals by which the playback equipment, editing equipment or the like is "cued" to carry out various functions. For example, the cue signals may represent the identity of the audio information program which is recorded, the length of that program, the number of programs recorded on a disc, the location of the end of that program, the composer, author or performers of that program, various movements of that program (particularly where such programs are musical performances), and the like. Moreover, if the audio PCM disc is used in conjunction with, for example, a display device, such as a line or text display, the latter may be controlled or synchronized with the reproduced audio information as a function of the cue signals on the disc. Still further, if the program information may be recorded in various different modes or formats, the cue data may identify such modes or formats so as to condition the playback apparatus to be compatible therewith.

Many of the techniques which have been used to produce conventional analog audio record discs also may be used to produce audio PCM discs. For example, a so-called "master tape" may be prepared by recording the audio information on a magnetic tape; and this master tape then may be used to produce a "mother" disc, a "stamper" disc, or the like, from which replica discs are made and ultimately sold to consumers. In order to record the aforementioned cue signals on replica audio PCM discs, it is desirable to have such cue signals recorded on the master tape. Usually, however, the master tape on which the audio PCM signals are recorded is not provided with all of the requisite cue signals which should be recorded on the audio PCM discs or which are helpful in producing such discs. Typically, the master tape is a video tape on which the audio PCM signals are recorded in pseudo-video format. That is, the audio PCM signals are recorded by a helical scan video tape recorder (VTR) in parallel, skewed tracks on a magnetic tape accompanied by synchronizing signals which are quite analogous to the conventional horizontal and vertical synchronizing signals normally provided in television signals. Also, and as is conventionally recorded by VTRs, so-called time code signals are recorded on the magnetic tape to indicate the relative location on the tape at which the respective tracks are found. Such time code signals facilitate rapid access to desired portions on the tape, and are quite useful in editing operations. The techniques of, for example, time code recording and editing are quite useful in preparing master tapes for audio PCM recording.

OBJECTS OF THE INVENTION

Therefore, it is an object of the present invention to provide cue signal recording apparatus for recording cue data on a magnetic tape; which cue data identifies predetermined characteristics of the information that also is recorded on that magnetic tape, and which cue data ultimately may be used in producing discs from that tape.

Another object of this invention is to provide improved apparatus by which cue data of the aforementioned type may be recorded on a magnetic tape.

A further object of this invention is to provide improved apparatus by which the record disc may be produced from a magnetic tape having recorded thereon cue data of the aforementioned type.

An additional object of this invention is to provide improved apparatus for recording cue data of the aforementioned type on a magnetic tape which is produced by editing a previously recorded tape.

A more specific object of this invention is to provide apparatus for recording cue data representing, for example, beginning, end and predetermined intermediate portions of program information, such as an audio program, in a track on magnetic tape which differs from the tracks in which the audio programs are recorded.

Another specific object of this invention is to provide apparatus of the aforementioned type wherein the cue data represents, inter alia, various sub-portions of each audio program.

Yet another specific object of this invention is to provide apparatus of the aforementioned type wherein the cue data is recorded in one or more different formats on the magnetic tape.

Various other objects, advantages and features of the present invention will become readily apparent from the ensuing detailed description, and the novel features will be particularly pointed out in the appended claims.

SUMMARY OF THE INVENTION

In accordance with the broad aspect of this invention, apparatus is provided for recording cue data identifying predetermined characteristics of information that is recorded in tracks on a magnetic tape. The recorded information is played back and a cue signal generator is operative to generate respective cue signals upon the occurrence of respective ones of predetermined characteristics in the played back information. Also, a code signal generator is operative to generate code signals having a predetermined relationship with the played back information. As one example, the code signals may represent the relative locations on the magnetic tape at which occur the predetermined characteristics of the played back information. The code and cue signals are stored in a memory; and the stored signals are used to produce cue data in a predetermined format. The cue data having the aforementioned format then is recorded in a track on the magnetic tape which differs from the tracks in which the information is recorded.

In one embodiment of the present invention, the code signals are recorded on the magnetic tape and the code signal generator includes a code signal playback device for playing back the code signals from the tape. In accordance with another embodiment, the code signals are generated by, for example, the manual operation of keyboard switches which are actuated by the user to represent the location along the magnetic tape at which are detected the various predetermined characteristics in the played back information.

In accordance with another aspect of this invention, a format selector comprised of manually operable switches is provided, each switch representing a respective characteristic of the played back information, and a respective switch being operated by the user when that predetermined characteristic is sensed. In one mode, the format selector operates to record a relatively simple cue data signal on the magnetic tape to indicate, for example, the beginning and end of an audio program and the relative locations thereof on the magnetic tape. In another mode, the format selector operates to record detailed cue data representing the identity of the predetermined characteristic which has been detected and the relative location on the magnetic tape at which the characteristic has been sensed. In both modes of operation, there need be no physical relationship, or alignment, between the cue data which is recorded in the separate track on the magnetic tape and the program information which is recorded in other tracks thereon.

In yet another aspect thereof, the present invention may be used with edit apparatus so as to record cue data associated with information which is edited, or selectively transferred from one magnetic tape to another. When used with edit apparatus, the cue data may represent not only the aforementioned predetermined characteristics in the played back information, but also various features of the edit operation, such as the source of the edited material, the edit points, and the like.

In a still further aspect of this invention, the magnetic tape on which both the information and cue data are recorded is used to produce a record disc. In accordance with this aspect, the record disc is, for example, an audio PCM disc; and the magnetic tape is a "master" tape on which the audio PCM signals and cue data are recorded. In producing the audio PCM disc, the audio PCM signals and cue data are multiplexed prior to recording, or "cutting" the disc.

BRIEF DESCRIPTION OF THE DRAWINGS

The following detailed description, given by way of example, will best be understood in conjunction with the accompanying drawings in which:

FIGS. 1A and 1B are schematic representations of the cue data and information, such as audio PCM information signals, recorded on a record disc;

FIGS. 2A–2C are schematic representations of the cue data that is recorded on, for example, a magnetic tape;

FIGS. 3A–3C are timing diagrams which are useful in understanding what is represented by some of the cue data which is used with the present invention;

FIGS. 12A–12E are timing diagrams which are useful in understanding typical operations of the keyboard shown in FIG. 11.

DETAILED DESCRIPTION OF CERTAIN PREFERRED EMBODIMENTS

Figure 4:
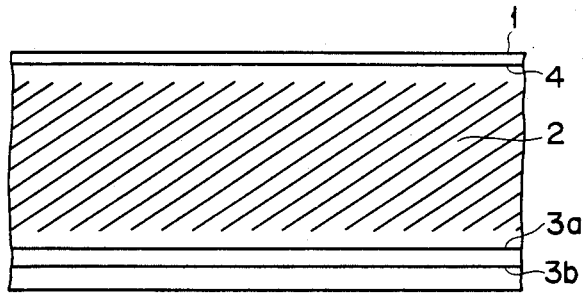
FIG. 4 is a schematic representation of a portion of the master magnetic tape which is used with this invention.

As will become readily apparent from the following description, the present invention relates to the recording of cue data that is useful in representing predetermined characteristics of virtually any type of information. One advantageous use of such cue data is to represent different portions and characteristics of, for example, audio programs which are recorded on an audio PCM disc. However, the teachings of the present invention need not be limited solely to record discs or to audio PCM signals recorded on such discs. Nevertheless, it is believed that a full understanding of the present invention will become clear by describing same in the context of audio PCM signals which are recorded first on a so-called master tape and from which master tape audio PCM discs subsequently are produced.

Turning now to FIG. 1A, there is schematically illustrated the format of a "frame" of signals which are recorded in, for example, one track of an audio PCM disc. The frame of signals includes data information, such as audio PCM signals, which are preceded by a synchronizing signal, or pattern, disposed at the beginning or "head" of the frame, followed by cue signals which, in one example, are represented as 14-bit cue signals $C_1$–$C_{14}$. In the embodiment described herein, the 14-bit cue signal is formed by multiplexing individual bits of respective cue data channels. More particularly, eight cue channels may be provided, and the 14-bit cue signal is formed by selecting one bit from each of these eight cue channels, and then converting the resultant 8-bit cue signal to a 14-bit cue signal. Those of ordinary skill in the art will recognize that such an 8/14 bit conversion is helpful in improving noise immunity of the digital signal.

FIG. 1B represents ninety-eight successive data frames, each frame having the format illustrated in FIG. 1A. It is seen herein that eight cue channels are provided, these cue channels being represented as channels P, Q, R . . . W. Examples of the P-channel cue data and the Q-channel cue data are described below. These channels represent predetermined characteristics of the information with which they are recorded. For example, in an audio PCM recording system, the information is formed of audio information, such as musical programs. The P-channel and Q-channel cue signals may represent the beginning, end and certain intermediate portions of each musical program. As will be described, the P-channel cue data merely represents the occurrence of, for example, the beginning and end of a music program. The Q-channel cue data represents the beginning, end and intermediate portions of each music program, as well as the relative location on the record medium of such beginning, end and intermediate portions. The remaining R-channel, S-channel . . . W-channel cue signals may represent the title of audio, or music, program, textual information relating to those programs, the performers of those programs, and other data associated with such programs, as may be desired.

In the format illustrated in FIG. 1B, the information (e.g. audio PCM signals) recorded in data frame 0 are preceded by eight multiplexed bits (which subsequently are converted into a 14-bit character) consisting of, for example, the 0th bit from each of the P-channel, Q-channel . . . W-channel. Preferably, the eight bits $d_1$–$d_8$ in data frame 0 exhibit a synchronizing pattern referred to as sync pattern $S_0$. The next-following data frame 1 consists of useful data (e.g. audio PCM signals) preceded by the first bit in each of the P-channel, Q-channel . . . W-channel. These multiplexed first bits $d_1$–$d_8$ exhibit another synchronizing pattern which is identified as sync pattern $S_1$. Likewise, in next-following data frame 2, the data is preceded by the second bit in each of the P-channel, Q-channel, . . . W-channel. These multiplexed bits form the cue signal $d_1$–$d_8$. The remaining data frames 3–97 each are of a similar format to that shown in FIG. 1B and just described.

Each data frame shown in FIG. 1B is re-formatted to the format shown in FIG. 1A, wherein each 8-bit cue signal $d_1$–$d_8$ is converted to a corresponding 14-bit cue signal $C_1$–$C_{14}$. This data frame, including the synchronizing pattern, multiplexed cue signal and data (e.g. audio PCM signal) is used to produce an audio PCM disc. The illustrated frame shown in FIG. 1A may be recorded in a track on such an audio PCM disc.

As mentioned in the introductory portion of this specification, one technique for producing an audio PCM disc is to utilize in the disc-production process a master tape on which all the necessary audio PCM (and cue data) information is recorded. For example, the master tape containing the audio PCM signals and cue data may be used to etch or "cut" a mother or stamper disc from which replica audio PCM discs are stamped.

Referring again to FIG. 1B, it will be appreciated that, for example, the Q-channel data signal is formed of 98 bits, the first two bits, i.e. bits 0 and 1, being included in sync patterns $S_0$ and $S_1$, respectively, and the remaining 96 bits representing cue data. As will be described below, the Q-channel cue data is representative of relatively sophisticated cue information, such as the identity (e.g. address number) of a music program, the beginning and end portions of that program, and various intermediate portions, such as sub-addresses which may be used to represent, inter alia, a particular movement of a music program. In addition, the Q-channel cue data may include timing information representing the duration as well as relative times of occurrence of the different portions of the audio program.

The P-channel cue data may be relatively simpler than the aforementioned Q-channel cue data. For example, the P-channel cue signal may be a flag to indicate the beginning and end of an audio program, as well as a pause in that program. In a specific embodiment, the P-channel cue signal may be a two-level signal having a relatively lower level throughout the duration of an audio program and a relatively higher level throughout the duration of a pause within or between such programs. In addition, the P-channel cue signal may appear as an alternating signal having a frequency on the order of about 2 Hz to define the lead-out section of the record disc. It will be appreciated that detection of this 2 Hz signal is indicative of the lead-out section of the disc so as to suitably control the record disc playback device.

Thus, when the P-channel and/or Q-channel cue data of the aforementioned type is recorded on the record disc, desired programs may be quickly and selectively accessed for playback by detecting and processing the cue data; and desired portions of such programs may be selected directly. Thus, respective ones of the recorded programs may be selected at random; and the playback device with which the record disc is used may be operated in conjunction with the recorded cue data so as to shift quickly from one program to another and, moreover, from one portion of a program to yet another portion of a still further program. Hence, user selection of pre-recorded materials is greatly enhanced and is quite flexible.

In the format illustrated in FIG. 1B, it is seen that each frame includes one bit sample of each of the P-channel, Q-channel, . . . W-channel cue signals. With reference to the P-channel cue signal, as mentioned above, this signal is at a relatively high level throughout a pause interval, for example, and is at a relatively low level throughout an audio program interval. Hence, for each bit sample in the P-channel cue signal, there will be either a binary "0" or a binary "1" present depending upon whether the audio program, at the time of that bit sample, is present or whether a pause interval is present. The bit samples of the Q-channel cue signal are described below with respect to FIGS. 2A–2C.

FIG. 2A represents the 98 successive bits which comprise a Q-channel cue signal. As illustrated, the first two bits (which appear in data frames 0 and 1 in FIG. 1B) are included in sync patterns $S_0$ and $S_1$. The next four bits of this Q-channel cue signal (i.e. the bits contained in data frames 2–5) indicate whether the audio PCM signals represent 2-channel or 4-channel signals and, moreover, whether the original audio information has been subjected to pre-emphasis. The next four bits of the Q-channel cue signal (which appear in data frames 6–9) indicate the mode of the Q-channel. The Q-channel cue data may be as shown in FIG. 2B (mode 1) or as shown in FIG. 2C (mode 2). In mode 1, the cue data indicates the number (MNR) of the audio program, an index (X) number representing, for example, the number of a movement, or equivalent, in the event that the audio program is a music piece, and timing information (in terms of minutes, seconds and tenths of seconds) which represents substantially real time in the duration of the audio program. FIG. 2B also illustrates "spare" bits, represented by the cross-hatched area, in the event that further information is to be represented by the cue data. The 72 information bits included in this cue data are disposed in data frames 10–81, respectively (FIG. 1B).

The audio program number (MNR), sometimes referred to herein as the "music number" to indicate the number of the musical selection that is recorded on the record disc, preferably is a 2-digit number formed of two 4-bit BCD characters, and may be any decimal number from 00 through 99. Preferably, although not necessarily, music number MNR is set at 00 throughout all of the data frames in the lead-in track so as to identify that lead-in track on the disc. Also, the hexadecimal number AA is used as the music number (MNR) in all of the data frames in the lead-out track so as to identify that lead-out track. Index number (X) also is a 2-digit decimal number represented by two 4-bit characters. Preferably, a pause in or between audio programs is represented by the index number (X) 00; and the actual movement or intermediate portion of an audio program may be represented by any index number (X) from 01 through 99. The timing information is represented as a 5-digit number formed of a 2-digit minutes representation (tens and units), a 2-digit seconds representation (tens and units) and a 1-digit tenths of seconds representation. As a musical piece, for example, continues, the length-of-time of that piece is represented by updated timing information from zero until that musical piece ends. Hence, the timing information represents the length of time, up to that point, of the musical piece. The timing information also may represent the length of time of a pause between musical pieces; and in this representation, the timing information is decreased from a value representing the total length of time of the pause down to zero at the end of the pause and, thus, at the beginning of the next musical piece. Thus, during a pause interval, the timing information represents the amount of time remaining until the completion of that pause interval.

In mode 2 of the Q-channel cue data, as shown in FIG. 2C, the cue data is comprised of thirteen decimal digits, each formed of a 4-bit character, $N_1$–$N_{13}$. These digits may be used as a catalog or identifying number of the disc, similar to conventional bar-coding. Since the amount of data represented by the Q-channel cue signal in mode 2 is far less than that represented in mode 1, both modes can be recorded on the same disc, with mode 2, for example, being provided in or next adjacent the lead-in or lead-out track.

Returning to FIG. 2A, following the 72 bits of the Q-channel cue data is a 16-bit CRC code signal. This CRC code signal is conventional and is utilized to detect and correct errors that may be present in the 80-bit Q-channel data. It is recognized that the CRC code signal bits are disposed in data frames 82–97 (FIG. 1B) of the Q-channel.

The relationship between the P-channel and Q-channel cue data and the actual audio programs which are recorded on the audio PCM disc are illustrated schematically in FIGS. 3A–3C. FIG. 3A represents successive tracks commencing with the lead-in track having, for example, the smallest radius, and terminating with the lead-out track having the greatest radius. Between the lead-in and lead-out tracks are four separate music programs, with pauses provided between the lead-in track and music program 1, between music programs 1 and 2, and between music programs 2 and 3. FIG. 3A further represents a cross-fade change-over from music program 3 to music program 4. The lead-out track follows immediately after the completion of music program 4.

It is appreciated that the music program information is represented in FIGS. 1A and 1B by the "DATA" area, and the P-channel, Q-channel, . . . W-channel cue data is multiplexed and recorded with this audio data, as best illustrated in FIG. 1B.

FIG. 3B represents the P-channel cue signal, wherein a pause interval is represented by a binary "1" and an audio program, or music interval, is represented by a binary "0". The actual duration of a binary "1" P-channel cue signal will be equal to the pause interval between audio programs provided that such a pause interval is equal to or greater than two seconds. If the actual pause interval is less than two seconds, such as indicated between programs 2 and 3, the duration of the binary "1" P-channel cue signal will, nevertheless be fixed at 2 seconds. Moreover, in the event of a cross-fade between two music programs, such as between music programs 3 and 4, the P-channel cue signal will, nevertheless, exhibit its binary "1" level for the fixed period of 2 seconds, as illustrated. As also illustrated in FIG. 3B, the P-channel cue signal appears as an alternating signal throughout the lead-out interval.

The actual signals which are recorded in the P-channel for each data frame shown in FIG. 1B will be a binary "0" or a "1", depending upon the level of the P-channel cue signal illustrated in FIG. 3B at the time of occurrence of each respective data frame.

FIG. 3C represents, on separate axes, the music number (MNR), index number (X) and timing data included in the mode 1 Q-channel cue signal. As mentioned above, and as illustrated in FIG. 3C, the music number (MNR) is set at 00 to identify the lead-in track, and is set at AA to identify the lead-out track of the audio PCM disc. This music number (MNR) is changed over to the numerical value 01 upon the occurrence of the first pause interval to represent the first music program, and this music number (MNR) remains set at 01 throughout the duration of this first music program. At the completion of the first music program, the music number (MNR) is changed over to 02 to identify the second music program. As illustrated, the music number (MNR) is changed over at the pause interval separating music programs 1 and 2, and remains set at 02 throughout the second music interval. Consistent with the foregoing, the music number (MNR) is changed over to 03 to identify the third music program, and at the completion thereof, the music number (MNR) is changed over to 04 to represent the fourth music program. It will be appreciated that, if additional music programs are recorded on this disc, the music number (MNR) will continue to be incremented so as to properly identify the number of such additional music programs. Hence, the music number (MNR) serves as an address for each music program.

FIG. 3C also illustrates the index number (X) which, as mentioned above, is set at 00 to identify each pause interval. The index number (X) is other than 00 (that is, it is not 00) during the lead-in and lead-out portions of the disc, and also during the respective music programs. As an example, if the index number (X) represents a respective movement of each music program, such movements are identified by the 2-digit index number. Of course, the index number (X) can be used to represent other intermediate or sub-portions of each audio program.

Finally, FIG. 3C represents the change in time from time zero throughout each audio program, and also a change in time down to time zero during each pause interval. Thus, during a music interval, or audio program, the timing information included in the Q-channel cue data (FIG. 2B) represents the passage of time from the beginning of that program. In each pause interval, the time information commences at a value which represents the length of time of the pause interval, and gradually decreases to zero value at the completion of the pause interval.

The music number (MNR), index number (X) and time information, all shown in FIG. 3C, are represented as the 96-bit data shown in FIGS. 2A and 2B, this data being repeated, or updated, every 98 data frames, as shown in FIG. 1B. That is, at every 98 data frames, the time information is updated and, if there has been a change, the music number (MNR) and/or the index number (X) also is updated. If there has been no change in the music number (MNR) it remains constant. Likewise, if there is no change in the index number (X) it too remains constant. Nevertheless, the time information is updated every 98 data frames. It is recognized that, of course, time changes over the 98 data frames. However, it is expected that the overall system timing is such that, for example, 980 (or even 1,000) data frames occur each second and, therefore, the tenths-of-seconds digit in FIG. 2B normally will be updated only once every 98 data frames without loss of accurate timing data.

FIGS. 1–3 represent the cue data that is recorded on a record disc, such as an audio PCM disc. As mentioned above, the information recorded on such discs generally is derived from a master tape. This tape is used to "cut" a mother disc from which a stamper disc is made, the stamper disc then being used to stamp replica discs ultimately for use by consumers. The cue data shown in FIGS. 1–3 is not recorded on the master tape in the same format that is used to record the cue data on the audio PCM disc. Rather, the cue data which is recorded on the master tape merely is a "list" of events, or occurrences of predetermined characteristics in the audio programs (e.g. beginning, end and intermediate portions such as musical movements, or the like) together with times of occurrences of such characteristics. This cue data which is recorded on the master tape thus may be viewed simply as a "table of contents", and to distinguish the cue data which is recorded on the audio PCM disc from the cue data which is recorded on the master tape, the latter cue data is referred to simply as TOC (Table of Contents) data.

FIG. 4 is a schematic illustration of the signal tracks recorded on a magnetic tape 1, which magnetic tape may be used as the master tape from which the audio PCM discs may be produced. Magnetic tape 1 is of the type conventionally used to record video signals and is referred to herein as a video tape. Audio information, such as digital audio signals (or audio PCM signals) are recorded in skewed tracks 2 by the recording transducers of a helical scan recorder of the type similar to those used for recording video signals. Longitudinal tracks 3a and 3b, on which a video tape recorder normally records audio signals, have time code (TC) signals and TOC signals recorded therein, respectively. The time code signals TC advantageously may be of the conventional SMPTE time code representing hours, minutes, seconds and frames, and typically are incremented as the recording proceeds. Such time code signals thus represent respective addresses of tape 1 and indicate a relative location along the length of the tape so that they may be used to address, or access, a particular one of skewed tracks 2 to recover the information recorded in the accessed track. Since the use of time code signals on video tapes is known to those of ordinary skill in the art, further description thereof is not provided in the interest of brevity.

The TOC data recorded in track 3b is of a format described hereinbelow with respect to FIG. 8. Suffice it to say that this TOC data is provided with, for example, an audio program number (MNR) for identifying an audio program, (e.g. program 1, program 2, etc.) and the relative location of that audio program, as may be represented by a time code signal, an index number (X) for identifying, for example, the movement in a musical piece and the relative location of that movement, an indication of a change-over in the P-channel cue signal from "1" to "0" and vice versa, and the times of occurrences (or relative locations) of such change-overs. The manner in which this TOC data is generated will be described further hereinbelow. In a preferred embodiment, this TOC data is recorded sequentially in track 3b, and not necessarily in alignment or even in association with the program information recorded in tracks 2. For example, first all of the P-channel TOC data may be recorded successively and in sequence in track 3b, followed by all of the Q-channel TOC data (preferably of mode 1). Normally, it is expected that all of the TOC data will be recorded in substantially less than the full length of track 3b and, moreover, will occupy less length of tape 1 than is occupied by the audio information recorded in tracks 2.

The manner in which the TOC data is generated and recorded on video tape 1 will be described with reference to three separate techniques: (1) a so-called real time technique, wherein the TOC data is generated under the control of an operator while the operator is listening to the audio information played back from tape 1; (2) a so-called key-entered technique whereby substantially all of the TOC data is generated in response to operator control of a keyboard; and (3) a so-called editing technique whereby the TOC data is generated in conjunction with an edit operation. Broadly, all of the foregoing techniques result in the generation of a cue signal upon the occurrence of a predetermined characteristic in the audio information that is recorded on tape 1. Such predetermined characteristics comprise, for example, the beginning of an audio program, the end of that program, a pause between programs, and various intermediate portions included in a program, such as a change from one movement of a musical piece to another. It is appreciated that other detectable features of the audio program may be utilized as the predetermined characteristics upon which cue signals are generated.

Also in accordance with the broader aspects of the foregoing techniques, when a cue signal is generated a time code signal is generated to represent the relative location on magnetic tape 1 at which are recorded the aforementioned predetermined characteristics. This time code signal serves to address, or identify, the particular tracks 2 which are associated with the generated cue signal. As will be described, such time code signals may be generated by playing back the time code signals TC from track 3a of tape 1 or, alternatively, such time code signals may be generated by the manual operation of a keyboard. The manner in which the TOC data is derived and recorded will be explained in conjunction with the following description of each of the aforementioned TOC recording techniques.

Figures 5, 6:
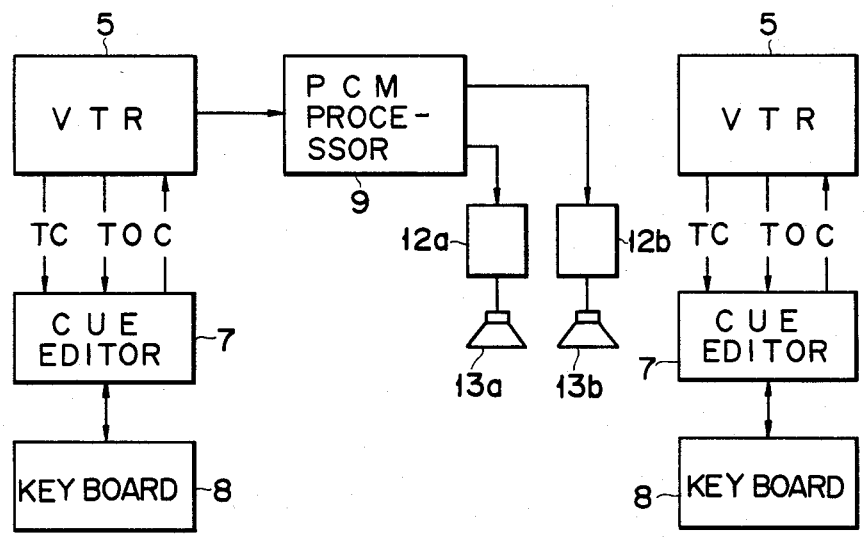
FIGS. 5–7 are block diagrams of different embodiments of the apparatus which is used to record cue data on a magnetic tape in accordance with the present invention.

FIG. 5 is a block diagram of one embodiment for carrying out technique (1) wherein TOC data is recorded in real time. In this embodiment, tape 1 is processed by a VTR 5 which is adapted to reproduce the audio PCM signals recorded in tracks 2 and, moreover, is adapted to record TOC data in track 3b. As illustrated, VTR 5 is coupled to a PCM processor 9 which functions to recover the original audio analog signals from the audio PCM signals recorded on tape 1, and to separate such audio signals into separate channels, such as left-channel and right-channel stereo signals. It is appreciated that if the audio PCM signals are recorded as 4-channel signals, PCM processor 9 will process such signals in four separate channels. In FIG. 5, PCM processor 9 is coupled to amplifiers 12a and 12b which, in turn, drive loudspeakers 13a and 13b, respectively, to reproduce the audio sounds which have been recorded as signals in skewed tracks 2 on tape 1. Thus, VTR 5 may be operated so as to play back the audio signals recorded on tape 1 and to permit the user to listen to such reproduced audio sounds.

VTR 5 also is coupled to a cue editor 7 which is described in greater detail hereinbelow with respect to FIGS. 10A and 10B. The cue editor is coupled to a keyboard 8 which, under the control of an operator, serves to control cue editor 7 to generate TOC data. The generated TOC data is supplied by cue editor 7 to VTR 5 for recording in track 3b of tape 1. As will be explained, the TOC data is generated in conjunction with time code signals (TC) which are reproduced from the tape by the VTR and supplied to the cue editor. As also illustrated in FIG. 5, once tape 1 is recorded with TOC data thereon, the information recorded on the magnetic tape may be reproduced, and the reproduced TOC data is supplied to cue editor 7 so as to check and verify that the generated TOC data is correct and accurate.

In operation, tape 1 having audio PCM signals recorded in tracks 2 is played back by VTR 5. At this time, it is assumed that the TOC data has not been recorded on track 3b. The reproduced audio PCM signals are supplied by VTR 5 to PCM processor 9 whereat they are processed (including error correction, digital-to-analog conversion, and the like) to recover the original audio signals which are used to drive loudspeakers 13a and 13b. Hence, as the audio information is played back from the magnetic tape, the operator listens to such audio information to sense predetermined characteristics therein, such as the beginning and end of audio programs, different movements of musical pieces, and the like. Concurrently with the playing of the audio PCM signals, the time code signals TC recorded on track 3a also are played back and supplied to cue editor 7. When the operator senses a desired characteristic of the reproduced audio information, such as the beginning of an audio program, a corresponding key on keyboard 8 is actuated. Cue editor 7 thus is supplied with a signal representing the actuation of this key, and that signal is stored in a suitable memory together with the time code TC which had been reproduced at the time of the actuation of this key. Similarly, when the next desired characteristic of the reproduced audio information is sensed, such as a new movement of a musical piece, the end of an audio program, a pause therein, or the like, a corresponding key on keyboard 8 is actuated. Thus, the memory included in cue editor 7 stores signals, sometimes referred to herein as cue signals, representing the actuation by the operator of respective keys of keyboard 8, together with time code signals TC which identify the relative location along tape 1 at which the characteristics represented by the cue signals are recorded.

After the tape has been played back, or after the operator has reproduced a sufficient portion thereof, VTR 5 is controlled, as by a suitable key on keyboard 8, to rewind, or pre-roll, the tape back to its beginning or other desired starting point. Then, the tape is advanced and the cue signals stored in the memory of cue editor 7 are recorded in track 3b thereof.

As mentioned above, the TOC cue signals which are recorded in track 3b include P-channel and Q-channel cue signals. These cue signals are recorded successively, for example, all of the P-channel cue signals are recorded, and then all of the Q-channel cue signals are recorded. Thus, the TOC signals recorded in track 3b are comprised of the P-channel cue signals followed by the Q-channel cue signals. Hence, tape 1 is recorded with the PCM and TOC signals, together with the time code signals TC previously recorded thereon, and may be used as the master tape from which the audio PCM disc is derived.

FIG. 6 is a block diagram of apparatus adapted to carry out technique (2) wherein the TOC data is generated in response to an operator-actuated keyboard. The apparatus shown in FIG. 6 is substantially similar to that shown in FIG. 5, except that the FIG. 6 embodiment omits PCM processor 9, amplifiers 12a and 12b and loudspeakers 13a and 13b.

In using the keyboard actuated embodiment of FIG. 6, the operator notes the time codes reproduced from tape 1 by VTR 5 at the occurrence of each characteristic of the recorded program information, such as the time code at the occurrence of the beginning of an audio program, the end of that program and changes within a musical piece from one movement to another. These notations may be made ahead of time and, for example, recorded on a suitable data sheet or form, such as by pencil and paper. Alternatively, these notations can be made by the operator when the magnetic tape having the audio program information recorded thereon is played back, such as described above with respect to the embodiment of FIG. 5. In any event, keyboard 8 is operated by the operator so as to key in to the memory of cue editor 7 the TOC data representing each predetermined characteristic (e.g. beginning, end and intermediate portions of the respective audio programs), together with the time codes representing the locations, or times of occurrence, of such predetermined characteristics. The TOC data is stored temporarily in the cue editor memory; and is read out therefrom when VTR 5 is operated so as to record such TOC data on track 3b of tape 1. Thus, the embodiment of FIG. 6 operates in an analogous manner to the operation of the embodiment of FIG. 5 for recording successive TOC data in track 3b, the recording of this data being independent of the actual locations on tape 1 at which the characteristics identified by the TOC data are recorded. In both embodiments, and as mentioned above, first all of the P-channel TOC data is recorded and then all of the Q-channel TOC data is recorded. As will be explained below with respect to FIG. 8, the TOC data is recorded in successive sectors, each sector containing cue information to identify particular characteristics in the audio program and the relative locations on tape 1 at which the characteristics are recorded. For example, each sector may contain TOC data relating to m characteristics. In the preferred embodiment, P-channel TOC data relating to a greater number of characteristics may be recorded in a sector than Q-channel TOC data.

Figure 7:
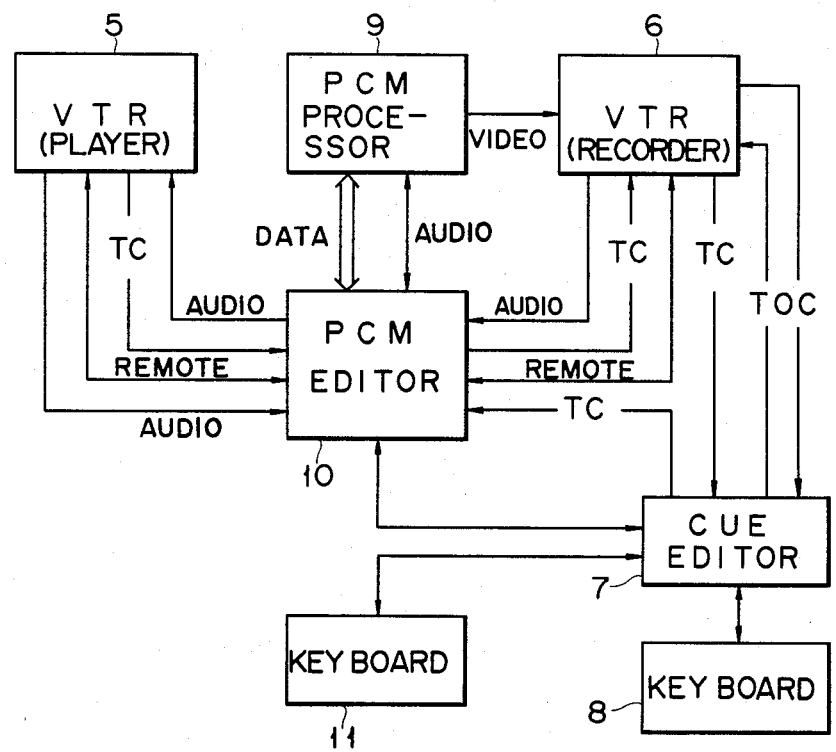

FIG. 7 is a block diagram of one embodiment of apparatus adapted to carry out technique (3) wherein TOC data is recorded in conjunction with an edit operation. In the illustrated embodiment, information played back from one magnetic tape (e.g. the "playback" tape) by VTR 5 is transferred to another magnetic tape (e.g. the "recording" tape) for recording thereon by a VTR 6. A PCM editor 10 is coupled to both VTRs and is responsive to the actuation of an edit keyboard 11 to selectively control the operation of the VTRs so as to selectively transfer desired information from one magnetic tape to the other. Since the transferred, or edited, information is assumed herein to be audio PCM information, editor 10 is referred to as a PCM editor.

The structure and operation of PCM editor 10 may be conventional; and typical embodiments of a suitable PCM editor which may be used in the embodiment shown in FIG. 7 are described in, for example, applications Ser. Nos. 116,401 and 154,525. Furthermore, since the magnetic tape playback recording devices with which PCM editor 10 is used may be video tape recorders, it will be appreciated that the PCM editor may be similar to conventional video editors. Suffice it to say that, under the control of keyboard 11, PCM editor 10 controls VTR 5 to access a desired audio program (as by searching for the time code which serves as the address for that program), play back that desired program, and transfer the program, via PCM processor 9, to the recording tape operated on by VTR 6. The PCM editor also operates to control VTR 6 to access a desired portion of the recording tape on which the transferred program is to be recorded. This too is achieved by using the time code recorded on the recording tape to address the desired location. Hence, selected, or isolated, audio programs may be transferred from the playback tape to the recording tape.

Moreover, PCM editor 10 is adapted to control the VTRs so as to carry out both "insert" and "assemble" edit operations. Accordingly, a selected program reproduced by VTR 5 may be "inserted" between two existing programs already present on the recording tape processed by VTR 6. Also, successive audio programs reproduced by VTR 5 may be "assembled", one after the other, on the recording tape by VTR 6.

It will be appreciated by those of ordinary skill in the art that PCM editor 10 functions to select edit points on both the playback tape processed by VTR 5 and the recording tape processed by VTR 6. Such edit points identify the respective locations along the playback and recording tapes at which edit operations are to be carried out. Typically, such edit points are identified by the respective time codes recorded on the playback and recording tapes. Furthermore, and as is known, the edit points are referred to as "cut-in" and "cut-out" points which designate the starting and stopping locations, or time codes, on the playback and recording tapes. It will be understood that the cut-in point typically identifies the beginning portion of an audio program and the cut-out point typically identifies the end portion of that program.

When an edit operation is carried out under operator-control of keyboard 11, the various cut-in and cut-out points selected by the operator may be displayed by suitable display devices provided on cue editor keyboard 8. Furthermore, as selected audio programs are transferred to VTR 6 and recorded on the recording tape thereby, a recording tape time code is generated by PCM editor 10 for recording on this recording tape. This recording tape time code also may be displayed on keyboard 8.

Keyboard 8 may be operator controlled so as to effect operation of cue editor 7 and VTR 6 in a manner similar to that described hereinabove with respect to FIGS. 5 and 6. Thus, under the control of keyboard 8, VTR 6 may be rewound, or pre-rolled, to play back desired ones of the edited programs recorded on the recording tape. Actuation of suitable keys, or switches on keyboard 8 serves to identify predetermined characteristics of the played back program, and the locations of such characteristics are identified by the time code read from this tape. For example, suitable keys may be actuated upon detecting the beginning and end of a program, as well as changes in the movement of the musical piece. The relative locations of such beginning and end portions, as well as the locations in the change in movements, are identified by the played back time codes. In addition, keyboards 8 and 11 both may be operated during an edit operation so as to transfer desired programs from the playback tape to the recording tape and, moreover, the beginning and end portions of such programs (i.e. the cut-in and cut-out points) also may be identified, together with their relative locations on the recording tape. As mentioned above, the cue signals which identify such portions, or characteristics, together with the time codes which identify the relative locations thereof, are stored in the memory of cue editor 7 for recording as TOC data on the recording tape by VTR 6. After an edit operation has been completed, and after the operator has identified those characteristics of the transferred audio program with which he is interested, cue editor 7 is controlled by keyboard 8 to operate VTR 6 so as to rewind the magnetic tape processed thereby and then record in, for example, track 3b, the TOC data stored in the cue editor memory. As in the embodiments described above, the TOC data is recorded successively, e.g. in successive sectors, at locations in track 3b which are independent of the actual locations of the characteristics in tracks 2 at which such characteristics are recorded.

In all of the embodiments shown in FIGS. 5–7, the magnetic tape having TOC data recorded thereon may be played back in order to check and verify that the recorded TOC data corresponds to the TOC data which had been selected by the operator. As one example, the TOC data stored in the memory of cue editor 7 may be compared to the TOC data reproduced from tape 1, and an indication of this comparison may be provided. As another example, the reproduced TOC data may be displayed and compared, or verified, by the operator as being the TOC data which he had selected. It will be appreciated by those of ordinary skill in the art that various other arrangements may be provided to verify that the TOC data recorded on tape 1 is the same, or substantially the same, as the TOC data which had been selected by the operator.

Referring now to FIGS. 8A–8E, there is schematically illustrated therein a representation of the format in which the TOC data is recorded in, for example, track 3b of tape 1. Preferably, this TOC data is recorded as a frequency modulated (FM) signal. As mentioned above, TOC data is generated by the operation of respective keys provided on keyboard 8 in conjunction with time code data that is read from the magnetic tape. Let it be assumed that a basic element of the TOC data is a multi-byte sub-block, or word, which, for the P-channel cue signal, includes a flag signal representing, for example, the beginning of an audio program and the end of an audio program, and also includes time code data representing the relative location (or time of occurrence) along the magnetic tape at which the audio program begins or ends. This P-channel TOC data is, of course, stored in the memory of cue editor 7 as it is generated. Also stored in the memory of the cue editor is the Q-channel TOC data whose sub-block includes a mode flag (e.g. mode-1, mode-2, or the like), control data representing the number of channels (e.g. 2-channels or 4-channels) of the audio signals and whether those signals had been emphasized, a program number (MNR), an index number (X) and time code data representing the relative location (or time of occurrence) of the beginning, end or intermediate portion of an audio program on the magnetic tape.

Normally, the number of P-channel and Q-channel sub-blocks which are generated in response to the operator-actuated keyboard is well within the capacity of the cue editor memory. Preferably, a number of such sub-blocks are recorded in each of the respective sectors illustrated in FIG. 8A. However, it is possible that the total number of P-channel and Q-channel sub-blocks exceeds the cue editor memory capacity. In that event, the excess number of sub-blocks will be recorded in one or more additional sectors. FIG. 8A represents a preferred format by which such excessive sub-block generation may, nevertheless, be accommodated and recorded by the cue editor. This format includes a preamble 12 to identify the beginning of TOC data, followed by N separate sectors, each sector being adapted to contain a number of sub-blocks therein (to be described greater below), followed by a mid-amble section 13 which is provided to indicate that a number of P-channel and Q-channel sub-blocks exceeds the capacity of the cue editor memory, followed by additional sectors in which such excessive sub-blocks are recorded, and terminated by a post-amble section 14 to indicate the end of the TOC data. Preferably, the P-channel sub-blocks are recorded first, such as in sector 1, sector 2, and so on, followed by the recording of the Q-channel sub-blocks in, for example, sector 3, sector 4, . . . sector N.

It is recognized that the number of P-channel and Q-channel sub-blocks which are generated for each tape is a function of the number of audio programs recorded on that tape, the different movements in each musical piece, and other characteristics of the recorded information as may be detected by the operator. Hence, the amount of TOC data may vary from tape to tape and, in some instances, the total amount of TOC data may be recorded in less than N sectors, while in other cases the total number of TOC data may be recorded in more than N sectors. Mid-amble portion 13 is omitted if the total amount of TOC data is recorded in N sectors or less, that is, if the total amount of TOC data does not exceed the memory capacity of the cue editor memory. Nevertheless, whether mid-amble section 13 is included or not, the TOC data is bracketed between preamble section 12 and postamble section 14.

As best shown in FIG. 8B, preamble section 12 is comprised of the following sub-sections, arranged in order:

GAP 0: A pulse signal of the TOC data clock rate is provided in this GAP 0, which is adapted to dispose in a standby condition the TOC data recovery circuits that are used in recording a record disc. Such recovery circuits include a phase-locked loop for recovering the frequency modulated TOC data and also a window pulse forming circuit that is used to separate the essential P-channel and Q-channel cue signals from the format illustrated in FIG. 8A. These circuits are placed in their respective standby conditions in response to the signal which is recorded in the GAP 0 subsection. As an example, if a byte is comprised of 8 bits, then GAP 0 exhibits a duration of 5 bytes.

SYNC: This sub-section is provided with a synchronizing clock signal which is used by the phase-locked loop included in the FM demodulator of the TOC data recovery circuits in order to synchronize the phase-locked loop with the played back TOC data. The duration of the SYNC sub-section is 4 bytes.

IM 1: This sub-section provides the Index Mark to indicate the beginning of TOC data. The duration of the IM 1 sub-section is 1 byte.

GAP 1: The purpose of this sub-section is to provide sufficient tolerance to accommodate rewritten TOC data in the event that the rewritten data occupies greater space than the original. This may occur in the event that, during rewriting, the tape speed is not precisely the same as during the original data writing operation. The duration of the GAP 1 sub-section is 22±2 bytes.

FIG. 8B illustrates the format of each sector in which P-channel and Q-channel cue signals are recorded. Each sector is divided into an ID field followed by a data field. The ID field serves to identify the sector number (i.e. sector 1, sector 2, . . . sector N) and the tape number in the event that, for example, two or more master tapes are used in the production of record discs.

The data field contains the actual P-channel or Q-channel sub-blocks. The ID field is formed of the following sub-sections, in order:

SYNC: The purpose of this SYNC sub-section is the same as the SYNC sub-section described above with respect to the preamble.

AM 1: This Address Mark sub-section identifies the ID field and is of a duration equal to 1 byte.

SECTOR NO.: This sub-section identifies the particular sector number in which it is contained, and is formed of 2 bytes to identify a sector from 0 through, for example, 65,535.

TAPE NO.: This TAPE NO. identifies the particular master tape (e. g. master tape 1, 2, etc.) on which the TOC data is recorded.

CRC: This CRC code is conventional and is used for the purpose of error checking and correction of the information recorded in the ID field of the sector.

The ID field is separated from the data field by the GAP 2 sub-section. This GAP 2 sub-section is of an interval equivalent to 22±2 bytes and serves to provide a tolerance in the event that the TOC data is rewritten. In this regard, the GAP 2 sub-section is similar to the aforementioned GAP 1 sub-section.

The data field included in each sector has recorded therein either P-channel or Q-channel cue signals. In particular, the data field is provided with the following sub-sections, in order:

SYNC: The purpose of this SYNC sub-section is similar to that of the SYNC sub-section included in the ID field. Accordingly, the data field SYNC sub-section is provided with a signal by which the TOC data recovery circuits are phase-locked to the frequency modulated TOC data.

AM 2: This Address Mark sub-section is of a duration equal to 1 byte and indicates whether the P-channel or Q-channel cue signals included in the data field are invalid and should be ignored, or whether these signals are valid and represent proper cue data. For example, if the TOC data recorded in track 3b is revised, as during another cue edit operation, it is possible that TOC data which had been recorded previously might not be erased. Nevertheless, this previous TOC data should be identified as being invalid so as to be ignored during the production of a record disc. The address mark included in this AM 2 sub-section serves to provide such an identification.

DIM: This Data Identification Mark identifies the TOC data recorded in this sector as being either P-channel cue data or Q-channel cue data. If the latter, the Data Identification Mark also identifies the mode (e.g. Q mode-1 or Q mode-2). The Data Identification Mark preferably is comprised of 1 byte which, in decimal form, may be equal to 10 to identify P-channel cue data, 20 to identify Q-channel (mode-1) cue data and 21 to identify Q-channel (mode 2) cue data.

FIG. 8E illustrates a table which indicates the data identification mark representation of the respective cue data signals. Although not shown, it will be appreciated that the data identification mark also may represent the R-channel, S-channel, . . . W-channel cue signals by other decimal identifying representations.

LENGTH: This sub-section, which is comprised of 1 byte, represents the length of each P-channel or Q-channel sub-block, or word, in the next-following data sub-section of the data field. For example, each P-channel sub-block, or word, is comprised of 5 bytes. Each Q-channel sub-block, or word, (both mode-1 and mode-2) is comprised of 8 bytes. The LENGTH sub-section of the data field indicates the number of bytes per sub-block, or word.

DATA: The data sub-section is comprised of 128 bytes. Since each P-channel sub-block, or word, is comprised of 5 bytes, it is appreciated that 25 P-channel sub-blocks, or words, may be included in the DATA sub-section, with the remaining 3 bytes therein being unused. Conversely, since each Q-channel sub-block, or word, is comprised of 8 bytes, it is appreciated that 16 Q-channel sub-blocks, or words, may be included in the DATA sub-section. In the preferred embodiment, the DATA sub-section of a sector is provided with only P-channel sub-blocks, or words, or with only Q-channel sub-blocks, or words. Preferably, a DATA sub-section is not provided with a mixture of both P-channel and Q-channel sub-blocks, or words. Furthermore, although a maximum of 25 P-channel sub-blocks, or words, and a maximum of 16 Q-channel sub-blocks, or words, may be provided in the data sub-section, it is possible that less than this maximum amount may actually be provided. It is appreciated, particularly with reference to the Q-channel sub-blocks, or words, that the total number of sub-blocks, or words, included in the data sub-section is a function of the number of audio programs (MNR) and index numbers (X) which are generated by the operator. Thus, the actual number of sub-blocks, or words, included in the DATA sub-section is a function of the number of detected characteristics included in the audio programs recorded on the magnetic tape.

CRC: The CRC code is comprised of 2 bytes and is used to detect errors in the data field when the TOC data is reproduced or otherwise processed.

GAP 3: This gap is comprised of 23±3 bytes and provides some tolerance in the event that the TOC data is re-written. In this regard, GAP 3 is used for a purpose similar to that described above for GAP 2.

The remaining sectors likewise are comprised of ID and data fields similar to that just described for sector 1. Midamble 13 is provided immediately following sector N. As illustrated in FIG. 8C, the midamble is formed of the following sub-sections, in order:

SYNC: This SYNC sub-section is similar to the SYNC sub-section included in preamble 12, and described above.

IM 2: This Index Mark sub-section indicates that further data-containing sectors follow midamble 13. Of course, and as mentioned above, if all of the TOC data is accommodated in the N sectors following preamble 12, then the midamble section is not needed; and sectors (N+1) and so on are omitted.

GAP 4: This gap is comprised of 27±2 bytes and serves a purpose similar to that served by the preceding gaps.

If midamble section 13 is provided, additional sectors follow, each sector being of the type shown in FIG. 8B and containing ID and data fields. These additional sectors will be provided only for so long as P-channel and/or Q-channel sub-blocks, or words, are generated and recorded. Preferably, there is not a fixed number of sectors either between preamble 12 and midamble 13, or between midamble 13 and postamble 14. Following the last recorded sector, postamble section 14 is provided.

As illustrated in FIG. 8D, the postamble section includes the following sub-sections, in order:

SYNC: This SYNC sub-section is similar to, and is adapted to perform the same function as, the SYNC sub-section included in the preamble and midamble sections.

IM 3: This Index Mark is comprised of 1 byte indicating the end of the TOC data.

GAP 5: This GAP exhibits a length equal to about 27 bytes and confirms the end of the TOC data.

Figure 8:
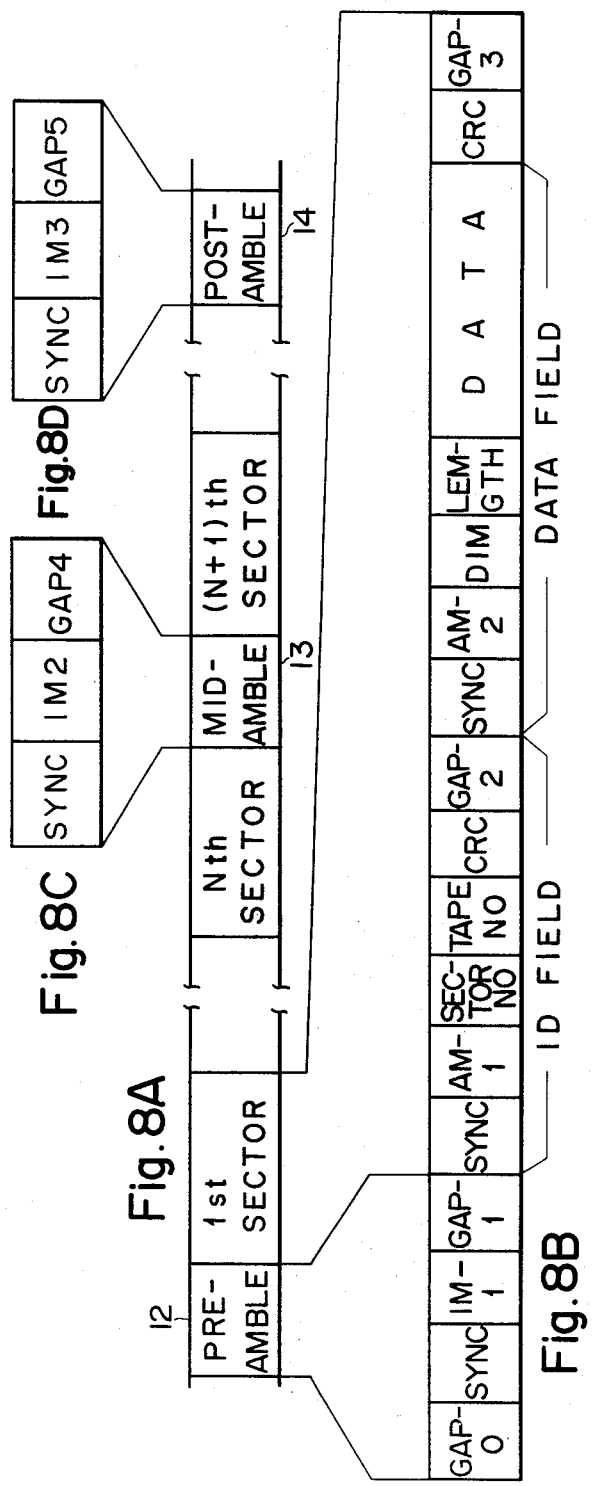
FIGS. 8A–8E schematically represent the format of the cue data which is recorded on the magnetic tape by the present invention.

A master tape of the type illustrated in FIG. 4 containing TOC data recorded in the format shown in FIG. 8 advantageously is used to produce, or "cut", as by laser cutting techniques, a "mother" disc from which a "stamper" disc is made to stamp replica discs. These discs are, in the example described herein, audio PCM discs. It is appreciated that the audio PCM data recorded on the disc produced from the master tape contains the same audio PCM data that had been recorded on the master tape. The disc also includes the cue data which is derived from the TOC data in track 3b of the master tape. Of course, the format of this cue data may differ from the TOC data, and the format preferably is of the type illustrated in FIG. 2. It is recalled that this cue data is multiplexed with the audio PCM data as shown in FIG. 1. One embodiment of apparatus which is used to produce a record disc from the master tape is illustrated in FIG. 9.

Figure 9:
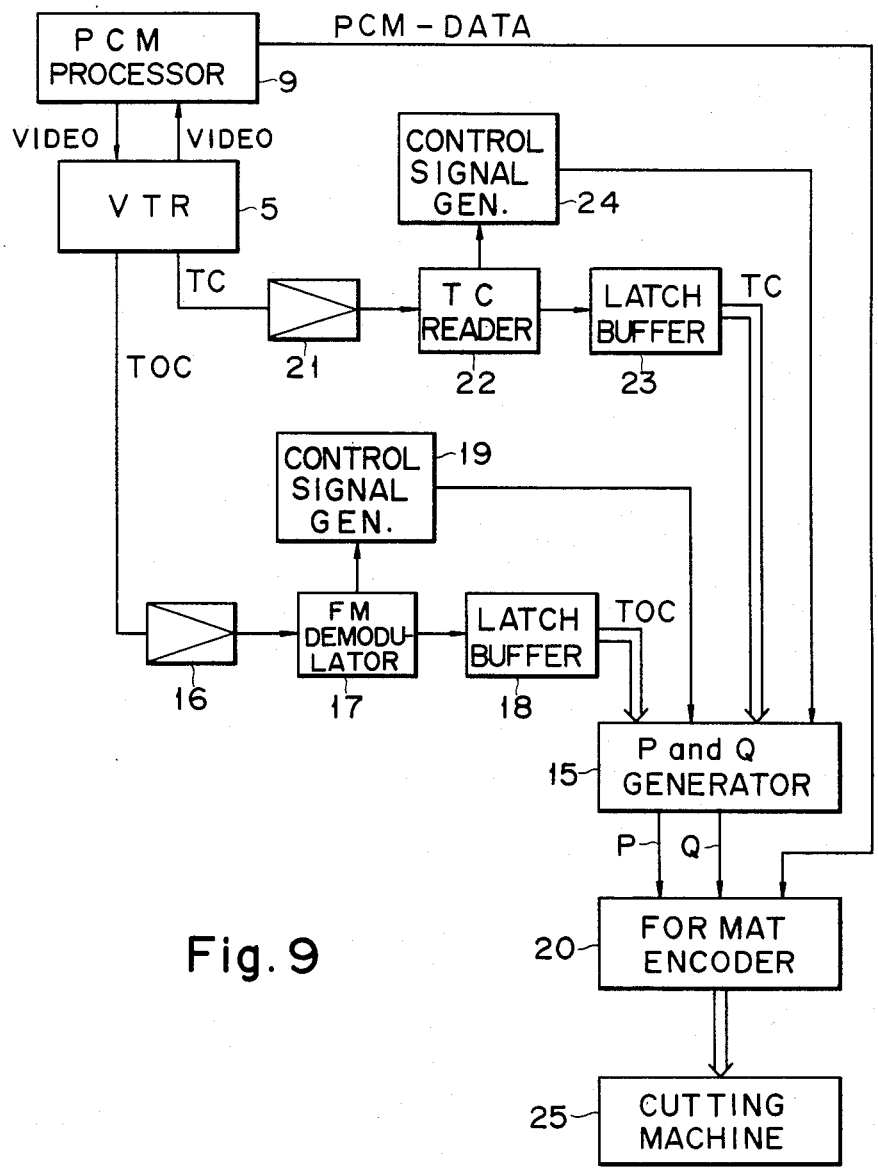
FIG. 9 is a block diagram of a further embodiment of the present invention wherein a record disc is produced in response to a so-called master tape having both cue data and information recorded thereon.

FIG. 9 includes an FM demodulator 17 coupled to VTR 5 to receive the TOC data which is reproduced from the master tape by the VTR. The frequency modulated TOC data is demodulated by the FM demodulator and is supplied to a P and Q generator 15 via a latch buffer 18. In addition, a time code reader 22 is coupled to VTR 5 to receive the time code signals read from the master tape by the VTR. These time code signals also are supplied to P and Q generator 15 via a latch buffer 23.

The P and Q generator includes a memory (not shown) in which the TOC data is stored. To facilitate a clocking in and subsequent reading out of this data with respect to the memory, control signal generators 19 and 24 are coupled to FM demodulator 17 and time code reader 22, respectively. The control signal generators are similar in that they extract from the demodulated TOC data and the reproduced time code signals timing pulses which are synchronized with such TOC data and time code signals. As illustrated, these timing pulses are supplied to P and Q generator 15 to synchronize the writing thereinto and the reading therefrom of the TOC data.

Preferably, P and Q generator 15 includes, in addition to a memory, a processor by which the TOC data described above with respect to FIG. 8 and the time code data are converted to the P-channel cue signals shown in FIG. 3B and to the Q-channel cue signals shown in FIGS. 2A–2C.

As also illustrated in FIG. 9, PCM processor 9 is coupled to VTR 5 so as to recover the audio PCM information when the master tape is played back by the VTR. This audio PCM information is supplied, together with P-channel and Q-channel cue signals from the P and Q generator, to a format encoder 20. This format encoder rearranges the audio PCM data, P-channel cue signals and Q-channel cue signals (as well as the R-channel . . . W-channel cue signals) in the format illustrated in FIG. 1B. Once in this format, the cue data and audio PCM data are supplied to a cutting machine 25 for cutting the "mother" disc.

In operation, the master tape first is played back by VTR 5 so as to load P and Q generator 15 with the TOC data that is reproduced from track 3b of the master tape. Hence, the memory in this P and Q generator stores, for example, a P-channel cue signal indication of the beginning and end of each audio program, as well as the time code address of each such beginning and end. This memory also stores a Q-channel cue signal indication of the number (MNR) of each audio program and the time code address of the beginning of each such program. Furthermore, this memory stores each Q-channel cue signal of each index number (X) in each audio program, and the time code address of each such index.

After the TOC data is loaded into the P and Q generator, the master tape is pre-rolled to its beginning, or starting point, and then the audio PCM data recorded thereon is reproduced. As the time code is read from the master tape during its reproduction, the P-channel and Q-channel cue signals produced by P and Q generator 15 are read from the memory therein, multiplexed with the audio PCM data and arranged in the format shown in FIG. 1B for recording on the "mother" disc.

In addition to rearranging the audio PCM data and cue data in the format shown in FIG. 1B, format encoder 20 also functions to detect and correct errors in the audio PCM data. Also, the frame synchronizing signal, or pattern, shown in FIGS. 1A and 1B, is generated and inserted into the signals which are recorded on the "mother" disc. Thus, the TOC data which is recorded on track 3b is reproduced from the master tape, multiplexed with the reproduced audio PCM data and recorded on the "mother" disc in the same tracks as the audio PCM data, and at the appropriate locations which correspond to the characteristics that are identified by the cue data. The resultant cue data which is recorded on the record disc is of the type described in detail hereinabove with respect to FIGS. 1–3.

Figure 10A:
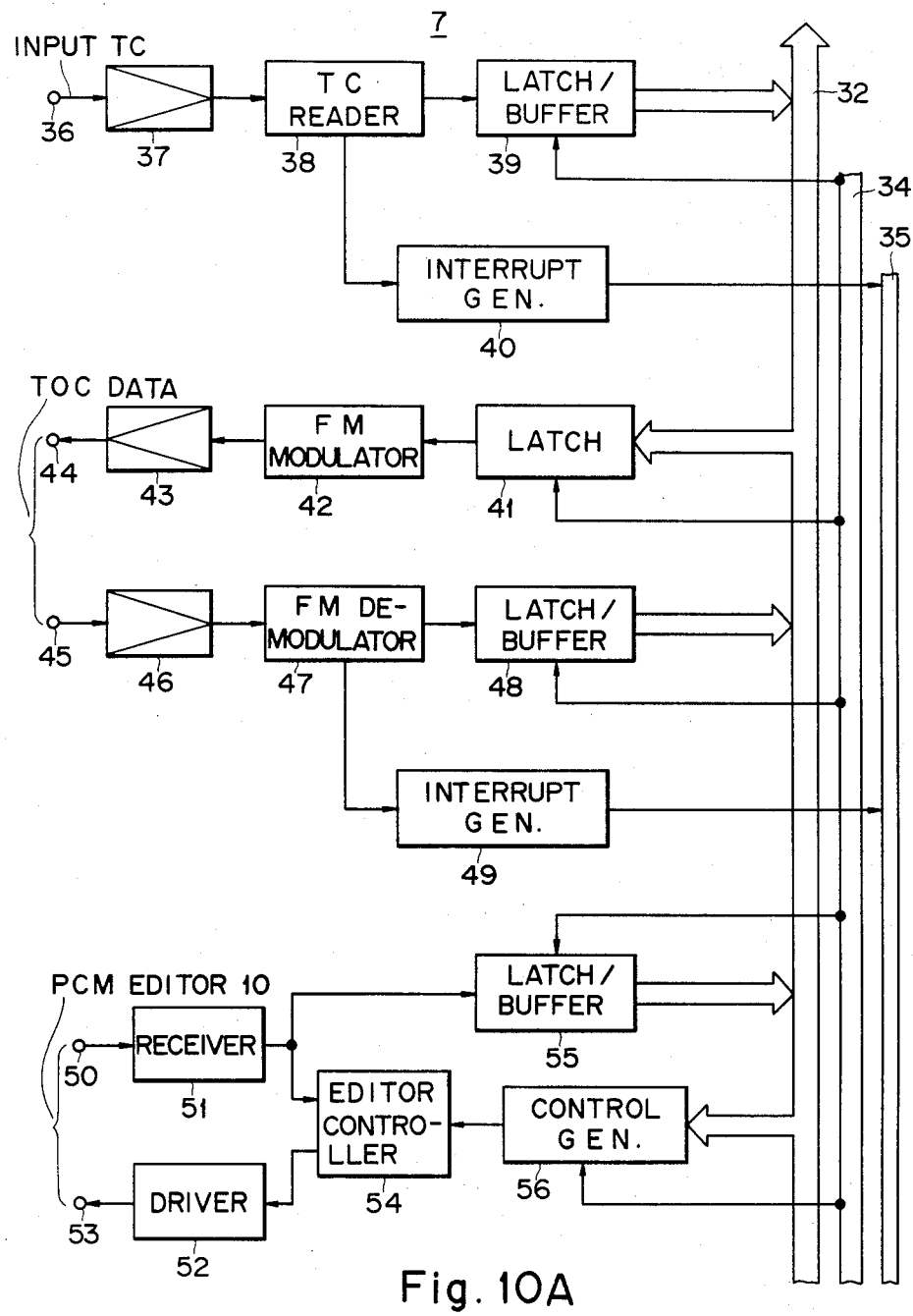
FIGS. 10A–10B together form a block diagram of a preferred embodiment of the cue data editor which carries out the present invention.
Figure 10B:
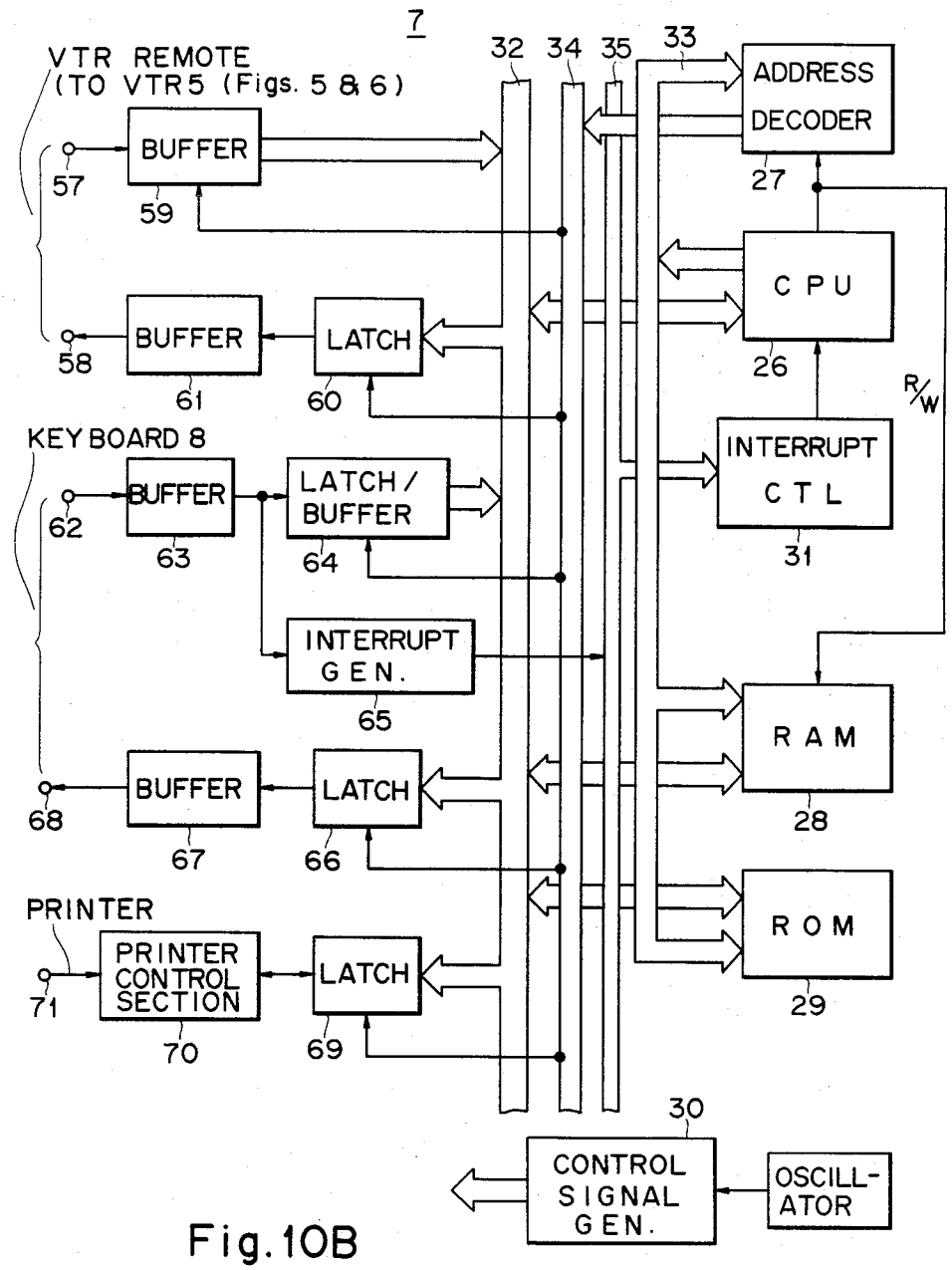

FIGS. 10A–10B are a block diagram of one embodiment of cue editor 7. This cue editor is comprised of a microcomputer including a central processing unit (CPU) 26, an address decoder 27, a random access memory (RAM) 28, a read only memory (ROM) 29 and an interrupt control circuit 31, all shown in FIG. 10B. An address bus 33 interconnects CPU 26 with each of address decoder 27, RAM 28 and ROM 29. In addition, and as illustrated, a read/write control over RAM 28 is effected by CPU 26. Element 30 is a control signal generator which is supplied with a periodic signal by an oscillator to generate clock and timing control signals for use in the microcomputer.

The microcomputer is adapted to receive signals from keyboard 8 and time code signals from the VTR, to generate TOC data therefrom and to supply this TOC data to the VTR for recording on the magnetic tape. In addition, the microcomputer is adapted to command the VTR to carry out record and playback operations; and when the cue editor is used in conjunction with a PCM editor, as shown in FIG. 7, the microcomputer is adapted to communicate with that PCM editor. To this effect, a data bus 32 is coupled to CPU 26 and RAM 28 in order to supply data to the microcomputer and to receive TOC data, as well as other function control data therefrom. An input/output (I/O) select bus 34 is coupled to address decoder 27 and is adapted to permit data to be supplied to data bus 32 from various ones of the external devices with which the cue editor is used, and also to receive data from such devices. This data interchange is controlled by CPU 26 in accordance with the program therefor stored in ROM 29.

In addition, an interrupt bus 35 is coupled to interrupt control 31 to receive interrupt request signals from various ones of the external devices with which the cue editor is used.

As illustrated in FIG. 10A, time code signals which are reproduced from the magnetic tape are supplied to data bus 32 and, thence, to RAM 28. The time code signals are received from the VTR at input terminal 36 from which they are amplified by amplifier 37, read by time code reader 38 and temporarily stored in latch buffer 39. Upon reading a time code signal, time code reader 38 also actuates an interrupt generator 40 which supplies an interrupt request via interrupt bus 35 to interrupt control 31. When the microcomputer acknowledges this request, address decoder 27 supplies, via I/O select bus 34, an enable signal to latch buffer 39, whereupon the time code signal stored in the latch buffer is applied to data bus 32 for storage in RAM 28.

Referring to FIG. 10B, keyboard 8 is coupled to an input terminal 62 of the illustrated cue editor. When the keyboard is actuated, a suitable signal representing the particular key which is operated is supplied to input terminal 62 and thence to a latch buffer 64 via a buffer amplifier 63. The key signal supplied to the latch buffer also serves to actuate an interrupt generator 65 which, in turn, provides an interrupt request to interrupt control 31 via interrupt bus 35. When the microcomputer acknowledges this interrupt request, address decoder 27 enables latch buffer 64 via I/O select bus 34, to supply the key signal stored in latch buffer 64 to RAM 28.

As will be described below with respect to FIG. 1, keyboard 8 also includes various displays and indicators. When a cue edit operation is carried out, selected ones of these displays and indicators are energized. Display data is supplied from CPU 26 to RAM 28 and thence from this RAM to a latch circuit 66 via data bus 32. This latch circuit is controlled by address decoder 27 via I/O select bus 34 and, when enabled, supplies display data to an output terminal 68 via a buffer amplifier 67. Hence, the appropriate display or indicator device included in keyboard 8 is actuated to apprise the operator of the operation then carried out.

Returning to FIG. 10A, the keyboard supplied signals and time code signals supplied to the microcomputer from keyboard 8 and from the VTR are used by the microcomputer to generate the TOC data described above and shown in the format illustrated in FIG. 8. This TOC data is stored in RAM 28 and supplied therefrom via data bus 32 to a latch circuit 41 (FIG. 10A). The latch circuit operates under the control of address decoder 27 via I/O select bus 34 to supply this TOC data to an FM modulator 42. Hence, the TOC data is frequency modulated and supplied to the VTR via a buffer amplifier 43 and output terminal 44. The frequency modulated TOC data is recorded in track 3b of tape 1.

As mentioned above, TOC data may be reproduced form the tape in order to compare and confirm that the TOC data which is recorded thereon is the same TOC data which had been selected by the operator. The reproduced TOC data is supplied to the microcomputer for comparison therein. As shown in FIG. 10A, such reproduced TOC data is supplied to an input terminal 45 and applied by an amplifier 46 to an FM demodulator 47. The demodulated TOC data then is temporarily stored in a latch buffer 48. When the TOC data is stored in the latch buffer, an interrupt generator 49 is actuated to supply an interrupt request to interrupt control 31 via interrupt bus 35. When the microcomputer acknowledges this interrupt request, latch buffer 48 is actuated to supply the reproduced TOC data to RAM 28 via data bus 32. The reproduced data stored in the RAM then is compared by CPU 26 to the desired TOC data which had been produced in response to the actuation of keyboard 8 and time code signals read from the VTR, this desired TOC data also being stored in RAM 28. An indication of the compared TOC data is provided by the keyboard in response to display signals supplied thereto by the microcomputer.

Figure 11:
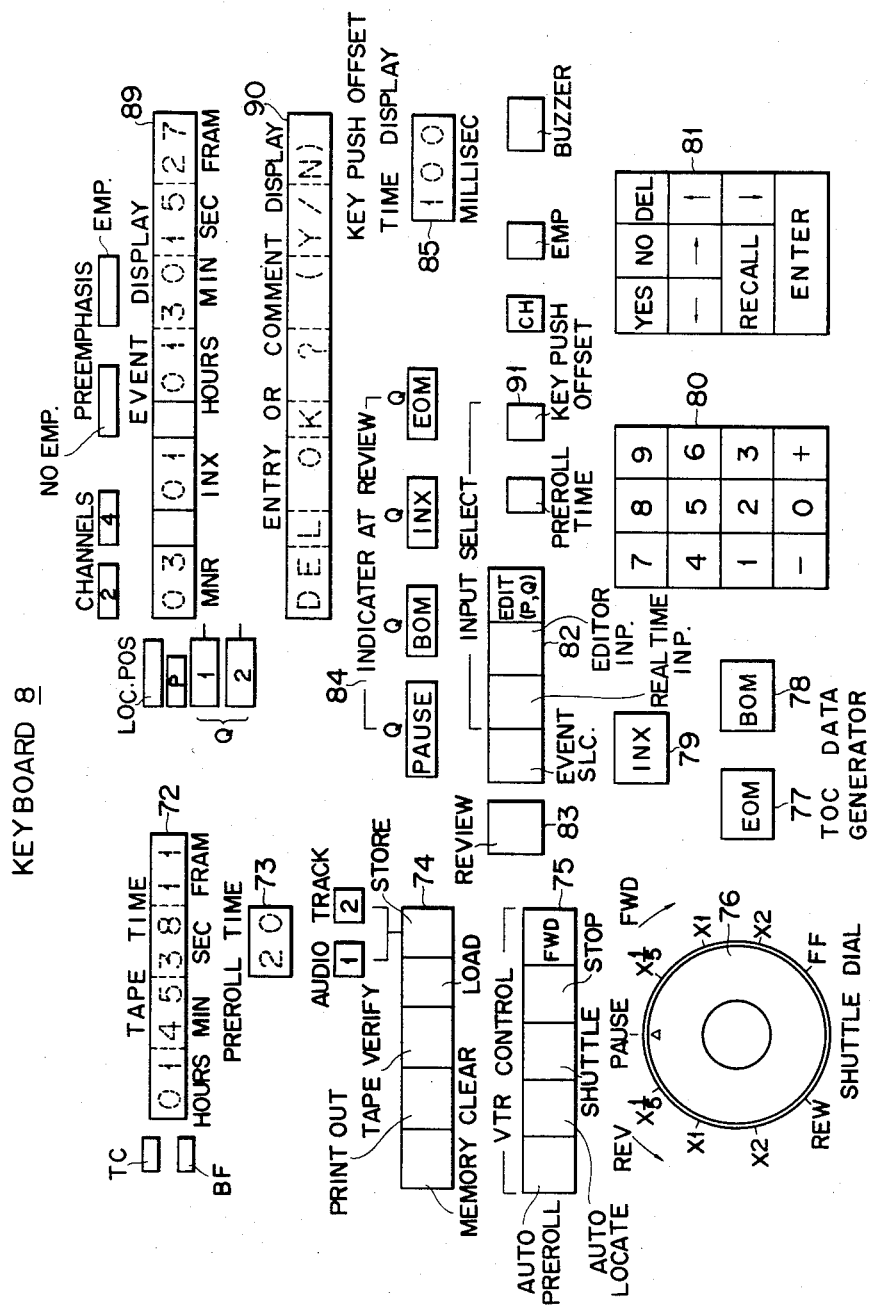
FIG. 11 is a schematic, plan illustration of a cue editor keyboard which can be used with the present invention.

When used with PCM editor 10, the cue editor shown in FIGS. 10A and 10B is coupled to the PCM editor via input terminal 50 and output terminal 53. Signals, such as the edit point signals described above, are supplied from the PCM editor to input terminal 50, received by a receiver 51 and supplied therefrom both to an editor controller 54 and a latch buffer 55. Such edit points are supplied via data bus 32 to RAM 28 when the latch buffer is actuated by address decoder 27 which supplies an actuating signal thereto via I/O select bus 34. Also, the address decoder actuates a control generator 56 to receive signals supplied thereto via data bus 32 from RAM 28 or from CPU 26, these signals also being supplied to editor controller 54. The editor controller responds to the signals supplied thereto from receiver 51 and also from control generator 56 to supply suitable signals to terminal 53 via a driver 52. Although not described in detail herein, it should be appreciated that indications of edit points, as represented by time code signals, are supplied from the PCM editor to input terminal 50 and thence to the microcomputer of cue editor 7; and the microcomputer supplies corresponding display signals representing such time code signals to the display and indicator devices of keyboard 8. Also, representations of the actuation of certain ones of the keys of keyboard 8, illustrated in FIG. 11, are supplied to the microcomputer of cue editor 7 which, in turn, applies corresponding VTR control signals to the PCM editor via driver 52 and output terminal 53. Hence, the operation of keyboard 8 results in selected operation of, for example, the recording VTR (such as VTR 6 of FIG. 7) via PCM editor 10.

In FIG. 10A, editor controller 54 is adapted to generate synchronizing and clock signals for PCM editor 10. Thus, signals which are supplied to the PCM editor from the microcomputer, as in response to the selected operation of keyboard 8, are properly synchronized with the PCM editor.

The cue editor is coupled to, for example, VTR 5 (FIGS. 5 and 6) via terminals 57 and 58 shown in FIG. 10B. Terminal 58 supplies VTR control signals to advance the magnetic tape therein and receives from the VTR signals representing the status or operating condition thereof. The signals received from the VTR at terminal 57 are supplied by a buffer 59 to data bus 32 when the buffer is actuated by address decoder 27 via I/O select bus 34. Control signals supplied to the VTR from terminal 58 are applied from the microcomputer to data bus 32 and thence to latch circuit 60. This latch circuit is actuated under the control of address decoder 27 via I/O select bus 34 to supply the control signals stored therein to terminal 58 via a buffer amplifier 61. Thus, cue editor 7 communicates with the VTR to control the operation thereof.

The microcomputer also is coupled to a printer which is adapted to provide a printed record of TOC data verification. A printer control section 70 is coupled to terminal 71, and this printer control section bi-directionally communicates with a latch circuit 69. This latch circuit is coupled to data bus 32 to receive data from the microcomputer to control printer control section 70. The latch circuit is actuated under the control of address decoder 27 via I/O select bus 34.

Turning now to FIG. 11, there is illustrated a schematic, plan representation of one embodiment of keyboard 8. The keyboard is provided with various manually actuable keys, or switches, and also with indicators and display devices which are useful in carrying out cue edit operations. As illustrated, a time code display 72 is adapted to display the time code, in terms of hours, minutes, seconds and frames, which is reproduced by the VTR. The reproduced time code is supplied to the microcomputer shown in FIGS. 10A and 10B from input terminal 36; and the microcomputer supplies to time code display 72, via output terminal 68 (FIG. 10B) the time code display signals. As magnetic tape 1 is advanced, or rewound, a corresponding update in the displayed time code ensues.

In addition, a pre-roll time display 73 is provided to display the length of tape which is pre-rolled during particular cue edit operations.

The keyboard also is provided with cue edit switches 74, two of which are illustrated as a LOAD switch and a STORE switch. When the LOAD switch is operated, TOC data is stored, or loaded into, RAM 28. This TOC data may be produced as a function of the time code then reproduced from the tape, in combination with the actuation of a particular TOC data generator switch, to be described. When the STORE switch of cue edit switches 74 is actuated, the TOC data stored in RAM 28 is recorded onto track 3b of the magnetic tape for storage thereon.

VTR control switches 75, together with a shuttle dial 76, are provided in order to control the operation of the VTR with which the cue editor is used. For example, VTR control switches 75 may include an AUTO LOCATE switch which, when actuated, serves to advance the magnetic tape to a desired, or predetermined, time code address. Shuttle dial 76 is bi-directionally operable to advance or rewind the tape at a slow, normal, fast or very fast speed, as desired.

TOC data generator switches include an END-OF-MUSIC (EOM) switch 77, a BEGINNING-OF-MUSIC (BOM) switch 78 and an INDEX (INX) switch 79. Normally, the operator will actuate a respective one of these switches upon detecting a corresponding portion of the audio program which is reproduced from the magnetic tape. For example, at the beginning of an audio program, the BEGINNING-OF-MUSIC switch 78 is actuated. The actuation of this switch results in the generation of TOC data which, when LOAD switch 74 is actuated, loads the generated TOC data into RAM 28. Likewise, when the end of an audio program is sensed, END-OF-MUSIC switch 77 is actuated; and this too results in the generation of corresponding TOC data. When a particular characteristic, such as a change in movement of a musical piece, or the like, is sensed, the operator will actuate INDEX switch 79. This too results in the generation of TOC data, and will be described further hereinbelow.

A numerical key pad 80 is provided to enable the operator to enter manually a desired time code. Key pad 80 normally is used when TOC data is generated by the embodiment shown and described with reference to FIG. 6.

Function control keys 81 are provided and are used for verifying TOC data, and for controlling a cue edit display.

Edit mode selector switches 82 are provided to select the particular mode in which the cue editor is to operate. For example, when operating in accordance with technique (1), as implemented by the embodiment of FIG. 5, a REAL TIME INPUT switch is actuated. When operating in accordance with technique (2), as implemented by the embodiment shown in FIG. 6, an EDIT switch is operated. Finally, when operating in accordance with technique (3), as implemented by the embodiment shown in FIG. 7, and as used with a PCM editor, an EDITOR INPUT switch is operated.

A REVIEW switch 83 is operable to reproduce the TOC data that is recorded on the magnetic tape so as to compare and verify that the recorded TOC data corresponds to the TOC data which has been selected by the operator. During this review mode, when a particular Q-channel cue signal is reproduced, a respective one of indicators 84 is energized to apprise the operator of the particular characteristic which is represented by the recorded Q-channel cue signal. Indicators 84 are adapted to indicate "pause", "BOM" (beginning of an audio program), "INX" (characteristics such as a change in movement) and "EOM" (end of audio program) indications respectively.

An offset display 85 also is provided. This offset display provides a display, such as in milliseconds, of the offset reaction time between the occurrence of a predetermined characteristic and the actuation by the operator of a respective TOC data generator switch. This offset, which may be preset and adjusted, as desired, by the operator, serves to cancel the expected delay between detection and operator action.

An event display 89 is adapted to display the TOC data which is generated by, for example, the actuation of TOC data generator switches 77–79. This event display may display P-channel cue signals or Q-channel cue signals, the latter in either mode-1 or mode-2, depending upon the actuation of selector switches disposed to the side of this event display register. As shown in FIG. 11, event display register 89 here displays the audio program number (MNR=03), the index number (X=01) and the time code at the time that X=01, this time code indicating one hour, thirty minutes, fifteen seconds and twenty-seven frames.

A data entry or comment display register 90 is provided to display various controls and functions of the cue edit operation, this display register cooperating with function control keys 81.

The manner in which the keyboard illustrated in FIG. 11 is operated in order to produce TOC data now will be described in conjunction with the timing diagrams shown in FIGS. 12A–12E. FIG. 12A is a schematic representation of the audio PCM signals which are reproduced from the magnetic tape. It is seen that these signals are similar to those shown in FIG. 3A. Thus, following a lead-in portion on the tape, a first audio program (music 1) is reproduced. As an example, it is assumed that this program is a musical piece having three separate movements, these movements being identified as INX 1, INX 2 and INX 3, respectively. Then, after a pause which is greater than two seconds, the second audio program (music 2) is reproduced. Thereafter, following a pause of less than two seconds, a third audio program (music 3) is reproduced; and this third audio program is cross-faded into a fourth audio program (music 4). Finally, a lead-out portion is provided on the magnetic tape. FIG. 12B represents an analog version of the time code which is reproduced from the magnetic tape as the tape is advanced from its lead-in portion, through the respective audio programs to its lead-out portion.

Let it be assumed that the cue edit operation is to be carried out in accordance with technique (1); and REAL TIME INPUT switch of the edit mode switches 82 is operated. This technique is implemented by the embodiment shown in FIG. 5; and it is recalled that, in accordance with this cue edit mode, the audio information is reproduced and, when predetermined characteristics therein are detected by the operator, appropriate ones of the TOC data generator switches are operated.

Following the lead-in portion, the operator detects the beginning of audio program (music 1) at time $t_1$. Accordingly, the operator actuates BOM switch 78. At that time, RAM 28 stores a P-channel cue signal equal to "0" and also stores the time code corresponding to time $t_1$. In addition, the identity of the BOM switch is stored. Furthermore, since this is the first audio program, RAM 28 also stores the Q-channel cue signal MNR=01. In addition, since this is the first movement in this program, the RAM additionally stores the Q-channel cue signal X=01. In one embodiment, although not stored in RAM 28, when the TOC data is recorded on the magnetic tape, the time code at two seconds prior to time $t_1$ (i.e. $t_1-2$) is recorded, together with P-channel cue signal P="1" at time $t_1-2$. Also, the cue editor will record on the magnetic tape the Q-channel cue signals (MNR=01) at time $t_1-2$ and (X=00) also at this time $t_1-2$, even though these Q-channel cue signals might not be stored in RAM 28. Such Q-channel cue signals are generated automatically.

It is assumed that at time $t_2$ INDEX switch 79 is actuated when the operator detects a change in the movement of the musical piece. Hence, the Q-channel cue signal (X=02) at time $t_2$ is stored in RAM 28. Likewise, at time $t_3$, the INDEX switch is actuated once again upon detection of a change in the movement of the musical piece. Consequently, the Q-channel cue signal (X=03) at time $t_3$ is stored in the RAM.

At time $t_4$ the first audio program ends. Hence, the operator actuates EOM switch 77, resulting in the storage in RAM 28 of the P-channel and Q-channel cue signals at time $t_4$ of P=1, MNR=02 and X=00.

When the beginning of the next audio program is detected at time $t_5$, the operator actuates BOM switch 78. Accordingly, the P-channel and Q-channel cue signals now generated are P=0 and X=01. These signals are stored in RAM 28 together with the time code representation of $t_5$. It is seen from FIG. 12E that the audio program number (MNR) changed at the end of the previous audio program, and will not be updated until the completion of this second audio program.

At time $t_6$ the operator detects the end of the second audio program and actuates EOM switch 77. At that time, the following P-channel and Q-channel cue signals are generated: P=1, MNR=03 and X=00. Also, the time code representation of time $t_6$ is generated. These signals are stored in RAM 28.

At time $t_7$, the operator detects the beginning of the third audio program and actuates BOM switch 78. Hence, the P-channel cue signal P=0 at time $t_7$ is generated. However, since the difference between the time code signals $t_6$ and $t_7$ is less than two seconds, the previous P-channel cue signal of P=1 at time $t_6$ is erased from RAM 28 and now is replaced by P=1 at time $t_7-2$. In addition, the actuation of BOM switch 78 at time $t_7$ results in the generation of the Q-channel cue signal X=01 at time $t_7$.

At time $t_8$ the operator detects the fade-out of the third audio program and the concurrent fade-in of the fourth audio program. At this time he actuates BOM switch 78 once again. Accordingly, the microcomputer of cue editor 7 generates the following P-channel and Q-channel cue signals: P=0, MNR=04 and X=01. Also, the time code corresponding to time $t_8$ is stored in RAM 28. Further, the microcomputer senses at time $t_8$ the immediately preceding P-channel cue signal stored in RAM 28 also had been P=0. Hence, the microcomputer additionally writes into the RAM the further P-channel cue signal of P=1 at time $t_8-2$.

Finally, upon detecting the end of the fourth audio program, the operator actuates EOM switch 77, and upon detection of the lead-out portion of the magnetic tape, the microcomputer generates the following P-channel and Q-channel signals: P=2 at time $t_9$, and MNR=AA (hexadecimal) at this same time. This represent the lead-out portion of the magnetic tape.

After RAM 28 stores the TOC data generated in the above-described manner, STORE switch 74 is actuated. This drives the VTR to rewind the magnetic tape to its beginning, or initial point, and then the tape advances and the TOC data stored in the RAM is read out and recorded in track 3b. During this recording mode, the TOC data is disposed in the format illustrated in FIG. 8.

When the keyboard illustrated in FIG. 11 is operated in accordance with technique (2), whereby the TOC data is generated merely by the actuation of the respective switches, a suitable one of TOC data generator switches 77–79 is actuated and also the numerical switches 80 are actuated, the latter serving to generate time code data. This mode may be selected by operating the EDIT switch of edit mode switches 82.

When technique (3) is selected, as when the cue editor is operated in conjunction with a PCM editor, the EDITOR INPUT switch 82 is operated. Cut-in and cut-out edit points function as BOM and EOM points, resulting in an updating of the audio program number (MNR) and also resulting in the generation of the index number X=00. These Q-channel cue signals are stored in RAM 28 together with the time codes corresponding to these points, as read from the recording tape. Alternatively, once the cut-in and cut-out points have been selected, the audio program defined by these points may be transferred from the playback tape to the recording tape; and the operator may operate BOM switch 78 and EOM switch 77 at the beginning and end of this edit operation. This is similar to the first-mentioned technique (1) wherein the cue data is generated in real time.

The foregoing has described the manner in which the Q-channel cue signals are generated for mode-1. The mode-2 Q-channel cue signals are produced by the operator in response to the manual operation of function control switches 81 and numerical key pad 80.

While the present invention has been particularly shown and described with reference to preferred embodiments, it will be readily appreciated by those of ordinary skill in the art that various changes and modifications in form and details may be made without departing from the spirit and scope of the invention. For example, instead of recording TOC data in the format shown in FIG. 8, track 3b may have recorded therein the cue signals shown in FIGS. 2A–2C, as well as the P-channel cue signal shown in FIG. 3B. Also, suitable electronic sensors may be provided to detect pauses, beginning and end portions of audio programs, and other predetermined characteristics in the recorded information. Such automatic detection may be used in place of an operator, and such detection may result in the automatic generation of suitable P-channel and Q-channel cue signals. Such signals will be analogous to those which are generated in response to the actuation of TOC data generator switches 77-79 of FIG. 11. Still further, RAM 28 may be formed as a non-volatile memory, such as a bubble memory, to prevent the loss of cue data therein in the event of a power failure or other loss-of-memory event. Other changes and modifications have been described in the text hereinabove.

It is intended that the appended claims be interpreted as including all of the foregoing changes and modifications.

What is claimed is:

1. Apparatus for recording cue data identifying predetermined characteristics of information recorded in tracks on a magnetic tape, said apparatus comprising playback means for playing back said information; code signal generating means for generating code signals having a predetermined relationship with the played back information; cue signal generating means for generating respective cue signals upon the occurrence of respective ones of said predetermined characteristics in the played back information; memory means for storing said code signals and said cue signals; format means for producing cue data in a predetermined format in accordance with the stored code and cue signals; and recording means for recording said cue data in a track on said magnetic tape different from the tracks in which said information is recorded.

2. The apparatus of claim 1 wherein said code signals represent relative locations on said magnetic tape at which said information is recorded.

3. The apparatus of claim 2 wherein said code signals are recorded on said magnetic tape; and wherein said code signal generating means includes code signal playback means for playing back said code signals from said tape.

4. The apparatus of claim 3 wherein said code signals are time code signals representing the relative times at which said information is recorded on said magnetic tape.

5. The apparatus of claim 1 wherein said cue signal generating means include manual switch means selectively operable by a user when said user detects said respective ones of said predetermined characteristics in said played back information.

6. The apparatus of claim 5 wherein said switch means include keyboard means having a plurality of switches for respective ones of said predetermined characteristics, each of said switches being manually operable by the user when he detects a respective predetermined characteristic to generate a respective cue signal.

7. The apparatus of claim 6 wherein said code signals represent relative locations on said magnetic tape at which said information is recorded, said code signals also being recorded on said magnetic tape; and wherein said code signal generating means includes code signal playback means for playing back the code signals recorded on said magnetic tape, and means responsive to the manual operation of a switch included in the keyboard means of said cue signal generating means to detect the code signal played back at the time that said switch is operated.

8. The apparatus of claim 6 wherein said code signals represent relative locations on said magnetic tape at which said information is recorded; and wherein said code signal generating means includes a keyboard having manually operable keys selectively operated by the user to generate respective code signals.

9. The apparatus of claim 6 wherein said format means includes encoding means for encoding said cue and code signals in a selected one of at least two cue signal formats.

10. The apparatus of claim 9 wherein said encoding means includes format selector switch means operable by the user to select a desired cue signal format.

11. The apparatus of claim 10 wherein said format selector switch means includes a first switch operable to encode said cue signal to produce a flag signal indicative of the occurrence of a predetermined characteristic; wherein said code signal represents the relative location on said tape at which said predetermined characteristic is detected; and wherein said recording means is operative to record said flag signal and said code signal in a separate track on said magnetic tape independent of the actual location on said magnetic tape at which said predetermined characteristic was detected.

12. The apparatus of claim 10 wherein said format selector switch means includes a second switch operable to encode said cue signal to represent the occurrence and identity of a predetermined characteristic; wherein said code signal represents the relative location on said tape at which said predetermined characteristic occurred; wherein said format selector means is further operable to include, in said encoded cue signal, a location signal derived from said code signal; and wherein said recording means is operative to record in a separate track on said magnetic tape, successive encoded cue signals including location signals.

13. The apparatus of claim 12 wherein said format means further includes format identifying means for adding to the encoded cue signal a format identifying signal for identifying the cue signal format that has been selected.

14. The apparatus of claim 6 wherein the information recorded in said tracks on said magnetic tape is program information, and said predetermined characteristics include the beginning, end and predetermined portions of each program; and wherein the switches of said keyboard means are manually operable to generate cue signals representing the beginning, end and predetermined portions, respectively, of a program.

15. The apparatus of claim 14 wherein said code signals represent relative locations on said tape and are recorded on said tape; and wherein said code signal generating means include code signal playback means for playing back said recorded code signals, and means responsive to the operation of a switch of said keyboard means to detect the code signals played back at that time.

16. The apparatus of claim 14 wherein said code signals represent relative locations on said tape and are recorded on said tape; and wherein said code signal generating means include a keyboard having keys manually operable by the user to generate code signals generally corresponding to the code signals recorded on said tape at the locations whereat the beginning, end and predetermined portions of each program are respectively detected.

17. The apparatus of claim 1 wherein said information is audio information.

18. Apparatus for utilizing cue data recorded on a magnetic tape and representing predetermined characteristics of information also recorded on said magnetic tape, said apparatus comprising playback means for playing back said cue data and said information from said magnetic tape; memory means for temporarily storing said played back cue data; format means for combining the cue data stored in said memory means and the played back information into a combined signal having a cue data portion and an information portion; and utilization means for utilizing said combined signal.

19. The apparatus of claim 18 wherein said cue data is recorded on said magnetic tape in a track which differs from the track or tracks in which said information is recorded.

20. The apparatus of claim 19 wherein said magnetic tape has recorded further thereon code signals representing relative locations on said tape; wherein said playback means is operative to play back said code signals; and wherein said format means is operative in response to the played back code signals to combine said cue data stored in said memory means with the played back information.

21. The apparatus of claim 20 wherein said utilization means comprises means for making a disc record by recording said combined signal on a disc.

22. The apparatus of claim 21 wherein said cue data recorded on said magnetic tape includes a first portion containing data representing the predetermined characteristics of the recorded information and an associated second portion containing data representing the relative locations on said magnetic tape at which said predetermined characteristics occur.

23. Edit apparatus comprising: playback means for playing back from a first magnetic tape information recorded thereon and also playing back code signals representing relative locations on said first magnetic tape; recording means for recording in tracks on a second magnetic tape selected portions of the information played back from said first magnetic tape and also for recording code signals representing relative locations on said second magnetic tape; edit means for selecting edit points at which portions of the information played back from said first magnetic tape are recorded on said second magnetic tape; cue signal generating means for generating respective cue signals representing the occurrence of said edit points and the occurrence of predetermined characteristics in the played back information; memory means for storing said cue signals and code signals representing selected relative locations on said second magnetic tape; format means for producing cue data in a predetermined format in accordance with the stored cue and code signals; and means for supplying to said recording means the cue data produced by said format means for recording said cue data on said second magnetic tape in a track different from the tracks in which said information is recorded; whereby the cue data recorded on said second magnetic tape represents the predetermined characteristic in the information recorded on said second magnetic tape.

24. The apparatus of claim 23 wherein said cue signal generating means include keyboard means having a plurality of switches selectively operable by a user when the user detects a predetermined characteristic in the played back information for generating a respective cue signal.

25. The apparatus of claim 23 wherein said recording means is operative to record said cue data in successive sectors in said different track, the cue data in each sector representing the occurrence of a respective predetermined characteristic and the relative location on said second magnetic tape at which said predetermined characteristic is recorded, and the successive sectors being recorded in said different tracks at locations which are independent of the actual locations of the respective predetermined characteristics.

* * * * *